US007803054B1

(12) United States Patent
Ogus et al.

(10) Patent No.: US 7,803,054 B1
(45) Date of Patent: Sep. 28, 2010

(54) MULTI-VEHICLE CROSS-NETWORK COORDINATION

(75) Inventors: Aaron W. Ogus, Kirkland, WA (US); David E. Glerok, Duvall, WA (US); Christopher J. Tector, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1212 days.

(21) Appl. No.: 10/817,709

(22) Filed: Mar. 31, 2004

(51) Int. Cl.
*A63F 9/24* (2006.01)

(52) U.S. Cl. .......................................... 463/42; 463/31
(58) Field of Classification Search ................. 463/6–9, 463/42
See application file for complete search history.

(56) References Cited

U.S. PATENT DOCUMENTS

| 5,056,031 | A | * | 10/1991 | Nakano et al. ............... 701/301 |
|---|---|---|---|---|
| 5,408,598 | A | | 4/1995 | Pryor, Jr. |
| 5,695,400 | A | * | 12/1997 | Fennell et al. ................. 463/42 |
| 5,755,620 | A | * | 5/1998 | Yamamoto et al. ............. 463/34 |
| 5,816,913 | A | * | 10/1998 | Nakamura ....................... 463/6 |
| 5,899,810 | A | | 5/1999 | Smith |
| 6,042,477 | A | * | 3/2000 | Addink .......................... 463/42 |
| 6,076,114 | A | | 6/2000 | Wesley |
| 6,094,677 | A | | 7/2000 | Capek et al. |
| 6,256,047 | B1 | * | 7/2001 | Isobe et al. .................. 345/473 |
| 6,415,317 | B1 | | 7/2002 | Yelon et al. |
| 6,417,854 | B1 | * | 7/2002 | Isowaki et al. ............... 345/473 |
| 6,443,733 | B1 | | 9/2002 | Stone |
| 6,708,142 | B1 | * | 3/2004 | Baillot et al. ................... 703/2 |
| 6,947,761 | B2 | | 9/2005 | Hutcheson et al. |
| 7,004,839 | B2 | * | 2/2006 | Suzuki et al. .................. 463/42 |
| 2003/0177187 | A1 | | 9/2003 | Levine et al. |
| 2004/0029638 | A1 | | 2/2004 | Hytcheson et al. |
| 2004/0075677 | A1 | * | 4/2004 | Loyall et al. ................. 345/706 |
| 2004/0121829 | A1 | * | 6/2004 | Reed .............................. 463/6 |

(Continued)

FOREIGN PATENT DOCUMENTS

WO     WO9814886 A1     4/1998

(Continued)

OTHER PUBLICATIONS

Chang, et al., "Scalable and Efficient Update Dissemination for Distributed Interactive Applications", available at least as early as Sep. 21, 2006, at <<http://www.cc.gatech.edu/%7Etychang/mis/changt_disseminationFinal.ps >>, 8 pages.

(Continued)

*Primary Examiner*—Scott Jones
(74) *Attorney, Agent, or Firm*—Lee & Hayes, PLLC

(57) ABSTRACT

Multiple vehicles being simulated at multiple devices are coordinated across a network as part of a shared gaming experience. Participating devices initially synchronize a time base using a designated host device. During game play, local devices simulate local vehicles. Local devices also produce predicted vehicle states for the local vehicles and transmit the predicted vehicle states to remote devices with regard to network latency. Remote devices in turn produce interpolated vehicle states from the predicted vehicles states and then render the vehicles using the interpolated vehicle states. Interpolation values may also be employed to maintain the synchronized time base. Additionally, the interpolations may be tuned, especially with respect to collisions, by a glancing collisions handler, a dragging collisions effectuator, and/or a remote vehicle damage agent.

33 Claims, 14 Drawing Sheets

U.S. PATENT DOCUMENTS

| | | |
|---|---|---|
| 2005/0026692 A1 | 2/2005 | Dyl |
| 2005/0059491 A1 | 3/2005 | Oh |
| 2005/0192098 A1 | 9/2005 | Guo et al. |
| 2006/0135258 A1 | 6/2006 | Maheshwari et al. |
| 2006/0154713 A1* | 7/2006 | Sunazuka et al. ............. 463/6 |
| 2007/0027583 A1* | 2/2007 | Tamir et al. .................... 701/1 |
| 2007/0078918 A1* | 4/2007 | Nagasaka et al. .......... 708/200 |

FOREIGN PATENT DOCUMENTS

| | | |
|---|---|---|
| WO | WO03053531 A1 | 7/2003 |

OTHER PUBLICATIONS

Griwodz, "State Replication for Multiplayer Games", retrieved at <<http://delivery.acm.org/10.1145/570000/566505/p29-griwodz.pdf?key1=566505&key2=2838388511&coll=GUIDE&dl=GUIDE&CFID=1399240&CFTOKEN=70518556>>, ACM, 2002, pp. 29-35.

Knutsson, et al., "Peer-to-Peer Support for Massively Multiplayer Games", retrieved at <<http://www.cs.ualberta.ca/~anup/Courses/604/Presentation_files/Lihang/P2Pgames_Infocom04_Upenns.pdf>>, IEEE Infocom 2004, IEEE, 2004, 12 pages.

Lu, et al., "The Design of Synchronization Mechanisms for Peer-to-Peer Massively Multiplayer Games", available at least as early as Sep. 21, 2006, at<<http://www.cis.upenn.edu/~hhl/Papers/MS-CIS-04-xy.pdf>>, University of Pennsylvania, pp. 1-5.

McCoy, et al., "Dynamic Hybrid Strategy Models for Networked Multiplayer Games ", retrieved at <<http://www.comp.glam.ac.uk/ASMTA2005/Proc/pdf/game-07.pdf>>, Proceedings 19th European Conference on Modelling and Simulation, ECMS, 2005, 6 pages.

"A Distributed Control Scheme for Causality and Media Synchronization in Networked Multimedia Games", Ishibashi et al., Proceedings Eleventh International Conference on Computer Communications and Networks, IEEE, Oct. 14-16, 2002, pp. 144-149.

"Media Synchronization and Causality Control for Distributed Multimedia Applications", Ishibashi et al., IEICE Transactions on Communications, Mar. 2001, vol. E84-B, No. 3, pp. 667-677.

"A Synchronization Mechanism in Networked Virtual Environment", Wang et al., Proceedings IEEE Workshop on Knowledge Media Networking, Jul. 10-12, 2002, pp. 23-27.

"An Open Middleware for Large-scale Networked Virtual Environments", Tran et al., Proceedings IEEE Virtual Reality, Mar. 24-28, 2002, pp. 22-29.

"Performance Evaluation of a Method for Offering Impartiality to Game Members in Heterogeneous Network Environments", Ishikawa et al., Transactions of the Information Processing Society of Japan, Jul. 2001, vol. 42, No. 7, pp. 1819-1827.

"Cheat-Proof Playout for Centralized and Distributed Online Games", Baughman et al., IEEE INFOCOM, 2001, vol. 1, pp. 104-113.

Ercolano, "Rush Render Queue—Job Priorities", V 102.42 Jul. 11, 2005, retrieved on Jul. 6, 2009 at <<http://seriss.com/rush-current/rush/rush-priority.html>>, 5 pages.

Milojicic, et al., "Peer-to-Peer Computing", HP Laboratories, Jul. 3, 3002, Title Page and pp. 1-51.

Aronson et al., "Latency Hiding for Network Games", <<http://www.gamasutra.com/view/feature/3230/dead_reckoning_latency_hiding_for_.php>>, Sep. 19, 1997.

Bernier, "Latency Compensation Methods in Client-Server In-Game Protocol Design and Optimization", Proceedings of the Game Developers Conference, Feb. 2001.

Fujimoto, "Parallel and Distributed Simulation", Proceedings of the 31st Conference on Winter Simulation: Simulation—a Bridge to the Future, vol. 1, Dec. 1999.

Roberts et al., "Maximising Concurrency and Scalability in a Consistent, Causal, Distributed Vitrual Reality System, Whilst Minimising the Effect of Network Delays", Proceedings of the 6th Workshop on Enabling Technologies on Infrastructure for Collaborative Enterprises, Jun. 18-20, 1997, pp. 161-166.

Zhou et al., "Time-Space Consistency in Large-Scaled Distributed Vitual Environments", ACM Transactions on Modelingn and Computer Simulation, vol. 14, No. 1, Jan. 2004, pp. 31-47.

Ju, et al., "Mean Value Coordinates for Closed Triangular Meshes", International Conference on Computer Graphics and Interactive Techniques, SIGGRAPH 2005, ACM, 2005, pp. 561-566.

Worsey, et al., "An n-Dimensional Clough-Tocher Interpolant", Constructive Approximation, 1987, pp. 99-110.

\* cited by examiner

INTERPOLATION TUNER 414'

- GLANCING COLLISIONS HANDLER 414A
- DRAGGING COLLISIONS EFFECTUATOR 414B
- REMOTE VEHICLE DAMAGE AGENT 414C

FIG. 11

MULTI-VEHICLE CROSS-NETWORK COORDINATION

TECHNICAL FIELD

This disclosure relates in general to coordinating multiple vehicles across a network and in particular, by way of example but not limitation, to facilitating vehicle number scalability by predicting vehicles states on local devices and interpolating vehicle states on remote devices.

BACKGROUND

Video gaming has expanded beyond the niche markets of children and so-called "hard core" gamers. One reason video gaming has become mainstream entertainment is the extent of visual improvements in how games are depicted. They are now three-dimensional (3-D) and drawn far more lifelike. Another reason is the extent to which video games can simulate real-world environments from a physics perspective. Manipulated objects, light, and reactive physical objects bounce, reflect, and otherwise behave realistically. These two reasons relate to an appearance and a caliber of a video game.

Another reason for the increasing popularity of video games is the ability of a player to play against other opponents that are not proximate to the player via networking. Playing against, or with, other real people is typically more emotionally satisfying in terms of human interaction and socialization. Moreover, despite continued improvements in artificial intelligence (AI), it is still more challenging to compete against other humans at least from a creative and unpredictability standpoint. Of course, the ability to attain "bragging rights" over great distances as a motivation for networked game play should not be overlooked.

Although processing abilities and communication bandwidth continue to improve, maintaining the appearance and caliber of video games in a networked gaming environment is still difficult for game designers, especially as the number of players and gaming consoles involved increases. Game genres that are particularly popular for networked play are many, varied, and diverse. Examples include combat games, action games, role-playing games, strategy games, racing games, and so forth.

In racing games, for example, each player typically drives one car. If there are four drivers per game console and ten game consoles jointly engaged in a race, there are forty total cars to be simulated on the racecourse. Current processing and communication bandwidth limitations preclude handling forty cars while simultaneously maintaining the desired appearance and caliber of the racing game. Obstacles to scalability are analogous and equally daunting for other gaming genres.

Accordingly, there is a need for schemes and/or techniques that can enable the coordinated simulation of multiple vehicles across multiple networked devices in a scalable and/or efficient manner.

SUMMARY

Multiple vehicles being simulated at multiple devices are coordinated across a network as part of a shared gaming experience. Participating devices initially synchronize a time base using a designated host device. During game play, local devices simulate local vehicles. Local devices also produce predicted vehicle states for the local vehicles and transmit the predicted vehicle states to remote devices with regard to network latency. Remote devices in turn produce interpolated vehicle states from the predicted vehicles states and then render the vehicles using the interpolated vehicle states. Interpolation values may also be employed to maintain the synchronized time base. Additionally, the interpolations may be tuned, especially with respect to collisions, by a glancing collisions handler, a dragging collisions effectuator, and/or a remote vehicle damage agent.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

FIG. 11 is a block diagram of an exemplary interpolation tuner for addressing glancing collisions, dragging collisions, and remote vehicle damage.

DETAILED DESCRIPTION

Introduction

As noted above, racing games are one type of video game genre that is popularly played online. Implementation of the schemes and techniques described herein can result in scalable games that run smoothly even with a large number of players that are connected over links with varying characteristics. Each vehicle participating in a race is not separately and fully simulated on each device involved in the online race.

Instead, when racing in a networked game mode, vehicles participating in a race are coordinated across multiple devices via local prediction and remote interpolation. More specifically, each device simulates vehicles that are being driven locally thereat. Each device also predicts the future state of each local vehicle being simulated on the device. These predictions are sent to remote devices. At the remote devices, current states of the non-local vehicles are interpolated based on the predicted states. The cost of processing (e.g., central processor unit (CPU) and/or memory utilization) for interpolating the vehicle state as compared to fully simulating the vehicle state can be approximately $1/1000^{th}$.

Console-Based Gaming System

Figure 1:
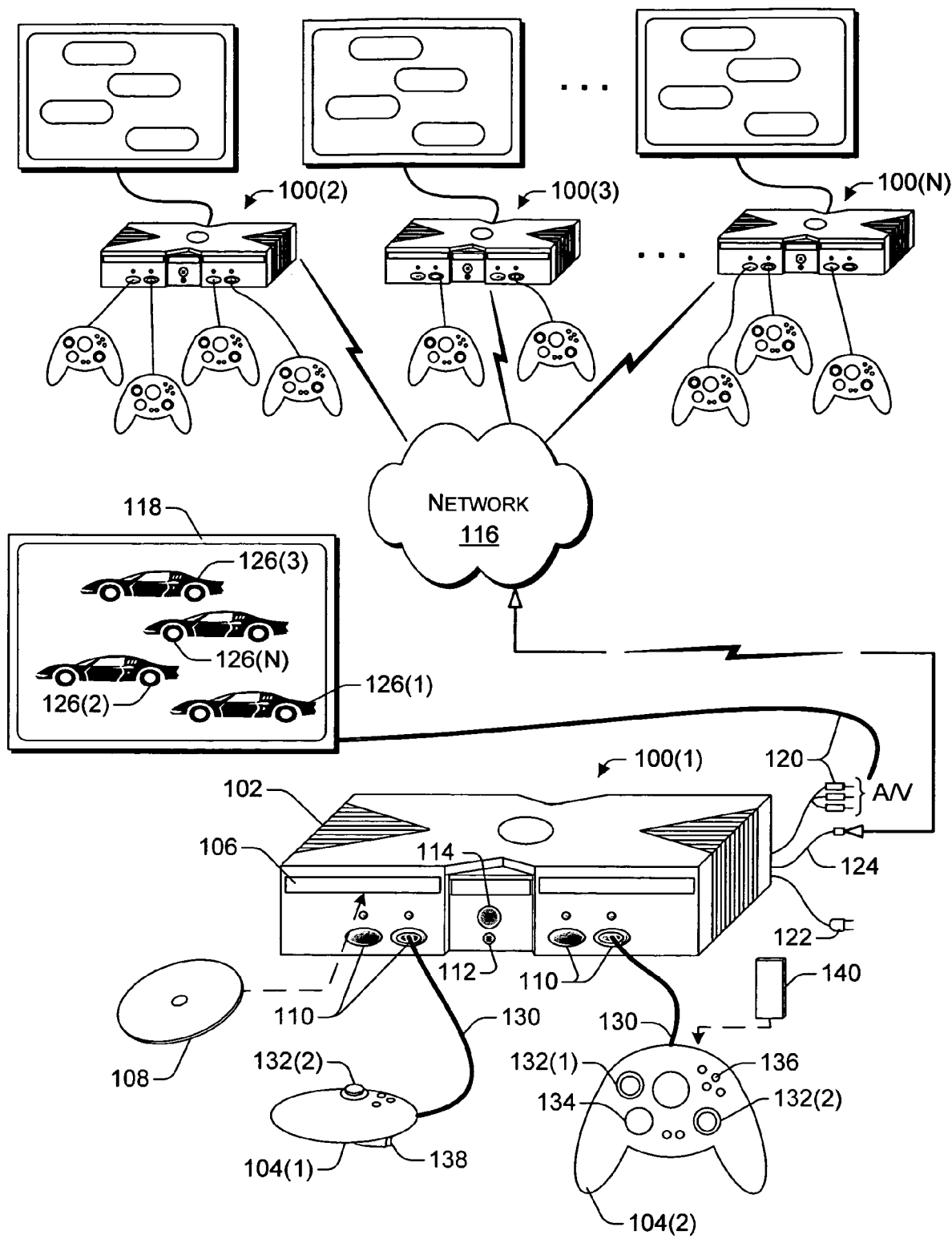
FIG. 1 illustrates an exemplary network of gaming systems in which multiple vehicles are involved in a joint gaming experience.

FIG. 1 illustrates an exemplary network of console-based gaming systems 100(1), 100(2), 100(3) . . . 100(N) in which multiple vehicles are involved in a joint gaming experience. Console-based gaming systems 100 are interconnected via a network 116. Network 116 may be implemented as a local area network (e.g., Ethernet cross-over cable, Ethernet hub, IEEE 1394 bus, universal serial bus (USB)), as a wide area network (e.g., Internet), some combination thereof, and so forth.

In a described implementation, each gaming system (referenced generally throughout as number "100") includes a game console 102 and up to four controllers 104, as represented by two controllers 104(1) and 104(2). Game console 102 is equipped with an internal hard disk drive (not explicitly illustrated in FIG. 1) and a portable media drive 106. The portable media drive 106 supports various forms of portable storage media as represented by optical storage disc 108. Examples of suitable portable storage media include DVD, CD-ROM, game discs, game cartridges, and so forth.

Game console 102 has four slots 110 on its front face to support up to four controllers 104, although the number and arrangement of such slots may be modified. A power button 112 and an eject button 114 are also positioned on the front face of game console 102. Power button 112 switches power on/off to game console 102 and eject button 114 alternately opens and closes a tray of portable media drive 106 to allow insertion and extraction of storage discs 108.

Game console 102 connects to a television or other display screen 118 via A/V interfacing cable(s) 120. Four vehicles 126 are displayed on display screen 118 to represent a racing program in progress. Game console 102 of console-based gaming system 100(1) is simulating vehicle 126(1). Similarly, vehicles 126(2), 126(3), and 126(N) are being simulated by game consoles 102 of console-based gaming systems 100(2), 100(3), and 100(N), respectively. Thus, with respect to game console 102 of console-based gaming system 100(1), vehicle 126(1) is a local vehicle and vehicles 126(2), 126(3), and 126(N) are remote vehicles. An exemplary cross-network racing situation is described further below with particular reference to FIG. 3.

A power cable 122 provides power to game console 102. Game console 102 may be further equipped with internal or externally-added network capabilities, as represented by a cable or modem connector 124 to facilitate access to network 116. Additional description of game console 102, especially with regard to exemplary internal components, is provided below with reference to FIG. 2.

Each controller 104 is coupled to game console 102 via a wire or wireless interface. In the illustrated implementation, the controllers are USB compatible and are connected to game console 102 via serial cables 130. Each controller 104 may be equipped with any of a wide variety of user interaction mechanisms. As illustrated in FIG. 1, each controller 104 is equipped with two thumbsticks 132(1) and 132(2), a directional or D-pad 134, surface buttons 136, and two triggers 138. These mechanisms are merely representative, and other known gaming interaction mechanisms may be substituted for or added to those shown in FIG. 1.

A memory unit (MU) 140 may be inserted into controller 104 to provide additional and portable storage. Portable memory units enable users to store game parameters and transport them for play on other consoles. In the described implementation, each controller 104 is configured to accommodate two memory units 140, although more or less than two units may be employed in other implementations.

Console-based gaming system 100 is capable of playing, for example, games, music, and videos. With the different storage offerings, titles can be played from the hard disk drive, from portable medium 108 in drive 106, from an online source via connector 124 and network 116, from a memory unit 140, and so forth.

A sample of what gaming system 100 is capable of playing back includes: (1) Game titles played from CD and DVD discs in portable media drive 106, from the hard disk drive, or from an online source. (2) Digital music played from a CD in portable media drive 106, from a compressed file on the hard disk drive (e.g., in Windows Media Audio (WMA) format), or from online streaming sources. (3) Digital audio/video played from a DVD disc in portable media drive 106, from a file on the hard disk drive (e.g., in a Windows Media Video (WMV) format), or from online streaming sources.

Figure 2:
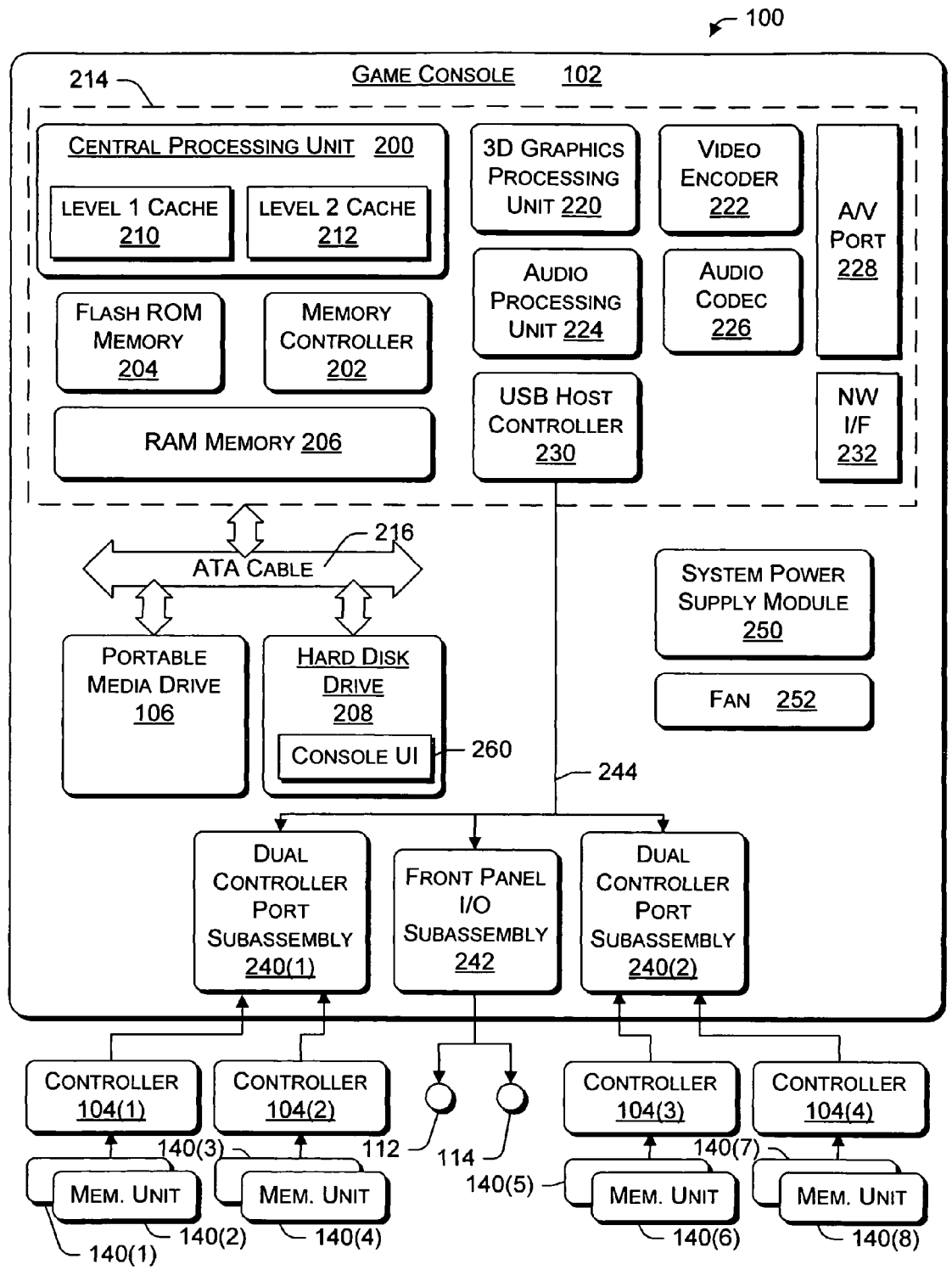
FIG. 2 is a block diagram of an exemplary gaming system as shown in FIG. 1 that is capable of coordinating multiple vehicles across a network.

FIG. 2 is a block diagram of a console-based gaming system 100 as shown in FIG. 1 that is capable of coordinating multiple vehicles across a network. Specifically, FIG. 2 illustrates functional components of gaming system 100 in greater detail. Game console 102 has a CPU 200 and a memory controller 202 that facilitates processor access to various types of media, including a flash ROM (Read Only Memory) 204, a RAM (Random Access Memory) 206, a hard disk drive 208, and portable media drive 106. CPU 200 is equipped with a level 1 cache 210 and a level 2 cache 212 to temporarily store data and hence reduce the number of memory access cycles, thereby improving processing speed and throughput.

CPU 200, memory controller 202, and various memory devices are interconnected via one or more buses, such as serial and parallel buses, a memory bus, a peripheral bus, a point-to-point connection, a switching fabric, an accelerated graphics port (AGP), and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As one suitable implementation, CPU 200, memory controller 202, ROM 204, and RAM 206 are integrated onto a common module 214. In this implementation, ROM 204 is configured as a flash ROM that is connected to memory controller 202 via a PCI (Peripheral Component Interconnect) bus and a ROM bus (neither of which are shown). RAM 206 is configured as multiple DDR SDRAM (Double Data Rate Synchronous Dynamic RAM) modules that are independently controlled by memory controller 202 via separate buses (not shown). Hard disk drive 208 and portable media drive 106 are connected to memory controller 202 via the PCI bus and an ATA (AT Attachment) bus 216. More generally, game console 102 typically includes a variety of processor-accessible media. Such media may be any available media that is accessible by game console 102 or another (e.g., electronic) device, and it includes both volatile and non-volatile media, removable and non-removable media, and storage and transmission media.

A 3D graphics processing unit 220 and a video encoder 222 form a video processing pipeline for high speed and high resolution graphics processing. Data is carried from graphics processing unit 220 to video encoder 222 via a digital video bus (not shown). An audio processing unit 224 and an audio codec (coder/decoder) 226 form a corresponding audio processing pipeline with high fidelity and stereo processing. Audio data is carried between audio processing unit 224 and audio codec 226 via a communication link (not shown). The video and audio processing pipelines output data to an A/V (audio/video) port 228 for transmission to display screen 118 (of FIG. 1) and possibly separate speakers (not shown). In the illustrated implementation, the video and audio processing components 220-228 are also mounted on module 214.

Also implemented on module 214 are a USB host controller 230 and a network interface (NW I/F) 232. USB host controller 230 is coupled to CPU 200 and memory controller 202 via a bus (e.g., a PCI bus) and serves as host for peripheral controllers 104(1)-104(4). Network interface 232 provides access to a network (e.g., LAN, Internet, etc.) such as network 116 (of FIG. 1) and may be any of a wide variety of various wired or wireless interface components including an Ethernet card, a modem, a Bluetooth module, a cable modem, an IEEE 802.11 or 802.15 compatible card, and so forth.

Game console 102 has two dual controller support subassemblies 240(1) and 240(2), with each subassembly 240 supporting two game controllers 104. A front panel I/O subassembly 242 supports the functionality of power button 112 and eject button 114, as well as any LEDs (light emitting diodes) or other indicators exposed on the outer surface of the housing of game console 102. Subassemblies 240(1), 240(2), and 242 are coupled to module 214 via one or more cable assemblies 244.

Eight memory units 140(1)-140(8) are illustrated as being connectable to the four controllers 104(1)-104(4), i.e., two memory units 140 for each controller 104. Each memory unit 140 offers additional storage on which games, game parameters, and other data may be stored. When inserted into a controller 104, memory unit 140 can be accessed by memory controller 202 and/or another memory controller located at controller 104.

A system power supply module 250 provides power to the components of gaming system 100. A fan 252 cools the circuitry within game console 102.

A console user interface (UI) application 260 is stored on hard disk drive 208. When game console 102 is powered on, various portions of console UI application 260 are loaded into RAM 206 and/or caches 210, 212 and executed on CPU 200. Console UI application 260 presents a graphical user interface that provides a consistent user experience when navigating to different media types that are available on game console 102.

Game console 102 implements a cryptography engine to perform common cryptographic functions, such as encryption, decryption, authentication, digital signing, hashing, and the like. The cryptography engine may be implemented as part of CPU 200 or in software stored in memory (e.g., ROM 204, hard disk drive 208, etc.) that executes on CPU 200, so that CPU 200 is configured to perform the cryptographic functions.

Gaming system 100 may be operated as a standalone system by simply connecting the system to a television or other display, such as display screen 118. In this standalone mode, gaming system 100 allows one or more players to play games, watch movies, or listen to music. However, with the integration of network connectivity made available through network interface 232, gaming system 100 may further be operated as a participant in a larger network gaming community by using a LAN, the Internet, some combination thereof, and so forth. In another implementation, gaming system 100 can be used in a larger gaming community by directly connecting gaming system 100 to a like gaming system. In this other implementation, rather than using a LAN or the Internet, the direct connection can be made by a cable to ports (not explicitly shown) on the respective gaming systems 100.

Video games, including racing games and those of other network-friendly genres as described herein, may be stored on various storage media for play on game console 102. For instance, a video game may be stored on a portable storage disc 108, which is read by portable media drive 106. Alternatively, the video game may be stored in hard disk drive 208, being transferred from a portable storage medium 108 or downloaded from an online network source. During play, portions of the game are temporarily loaded into RAM memory 206, as well as caches 210 and 212, and are executed by CPU 200.

Prior to describing schemes and techniques for multi-vehicle cross-network coordination, it should be noted that such schemes and techniques may be implemented with other console platforms besides the illustrated dedicated gaming system. Examples of other console platforms include set top boxes, digital video recorders, and other home entertainment units configured to support video games and (e.g., connectable/disconnectable) game controllers. Furthermore, although a described implementation is directed to game consoles 102, electronic devices generally may also be employed to effectuate the described schemes and techniques for coordinating multiple vehicles across a network. Examples of such devices include, but are not limited to, computers (desktop, laptop, etc.), personal digital assistants (PDAs), mobile telephones, portable or handheld gaming units, some combination thereof, and so forth.

Realizations for coordinating multiple vehicles across a network may be described in the general context of processor-executable instructions. Generally, processor-executable instructions include routines, programs, modules, protocols, objects, interfaces, components, data structures, etc. that perform and/or enable particular tasks and/or implement particular abstract data types. Coordinating multiple vehicles across a network, as described in certain implementations herein, may also be practiced in distributed processing environments where tasks are performed by remotely-linked processing devices that are connected through a communications link and/or network. Especially but not exclusively in a distributed processing environment, processor-executable instructions may be located in separate storage media, executed by different processors (possibly on different devices), and/or propagated or extant over transmission media.

Multi-Vehicle Cross-Network Coordination

Figure 3:
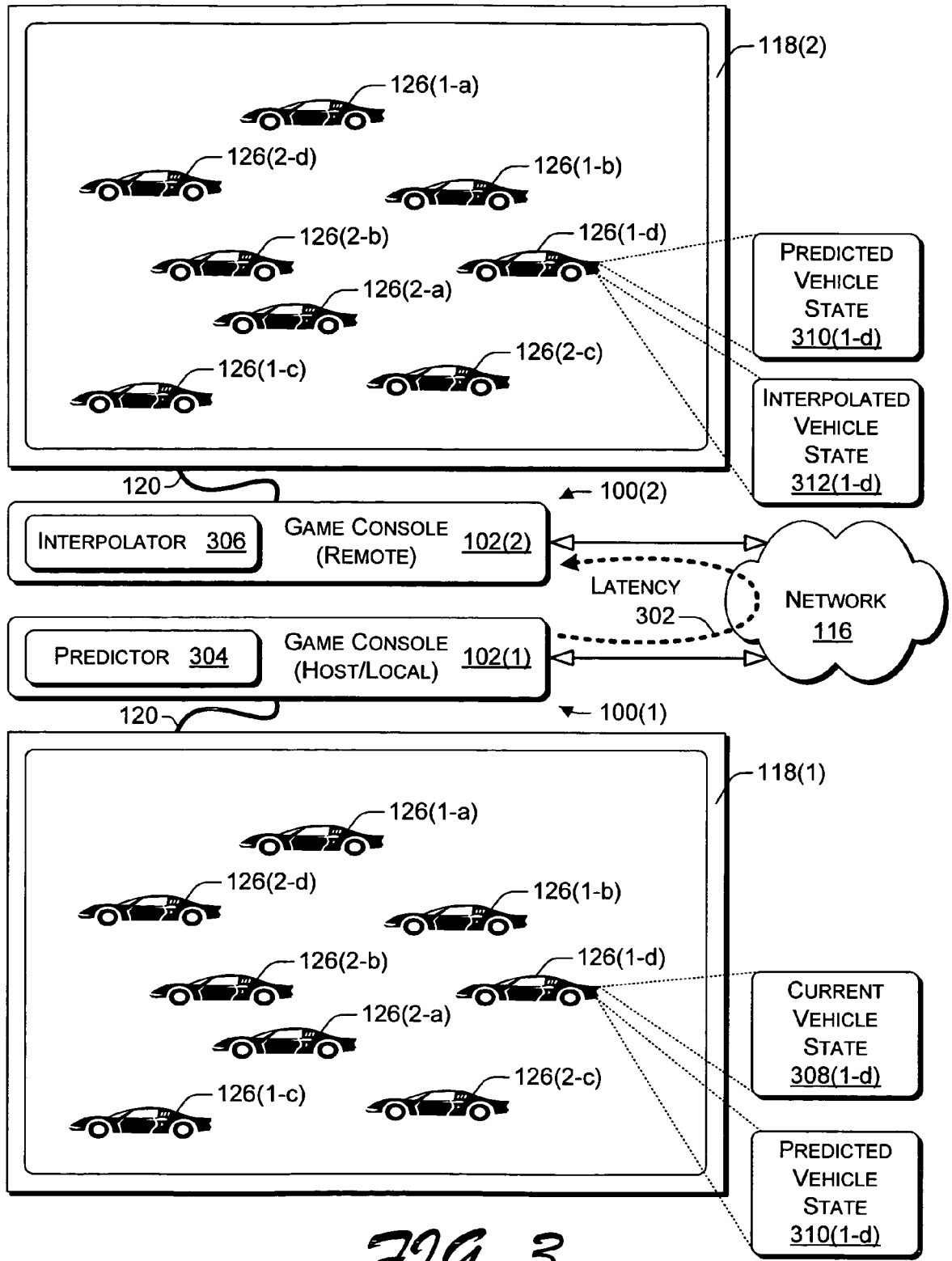
FIG. 3 depicts two gaming systems engaged in a multi-vehicle joint gaming experience that illustrates exemplary communication latency over a network.

FIG. 3 depicts two gaming systems 100(1) and 100(2) engaged in a multi-vehicle joint gaming experience that illustrates exemplary communication latency 302 over network 116. In a described implementation, game consoles 102(1) and 102(2) are engaged in a shared racing game with car vehicles 126 over network 116. Vehicles 126 can include manned and unmanned vehicles, motorized and un-motorized vehicles; flying, floating, and rolling vehicles; some combination thereof; and so forth. Hence, vehicles 126 can include cars, trucks, boats, space ships, planes, bicycles, motorcycles, hovercraft, and so forth.

Although relative to a given vehicle 126, game console 102(1) is considered the local game console, and game console 102(2) is considered the remote game console for purposes of explanation. Game console 102(1) is shown with a predictor 304, and game console 102(2) is shown with an interpolator 306. However, each game console 102 includes both a predictor 304 and an interpolator 306. By way of example, vehicle 126(1-d) is associated with a current vehicle state 308(1-d) and a predicted vehicle state 310(1-d) at game console 102(1), and vehicle 126(1-d) is associated with predicted vehicle state 310(1-d) and an interpolated vehicle state 312(1-d) at game console 102(2).

Four players co-located with game console 102(1) are directing (e.g., driving) vehicles 126(1-a), 126(1-b), 126(1-c), and 126(1-d). Four players co-located with game console 102(2) are directing (e.g., driving) vehicles 126(2-a), 126(2-b), 126(2-c), and 126(2-d). Although only two game consoles 102 and eight total vehicles 126 are specifically illustrated, additional game consoles 102 and/or vehicles 126 may be participating in the shared racing game. For example, forty vehicles 126 and ten game consoles 102 may be involved in a joint racing game.

As noted above, modern gaming provides an extraordinarily realistic "frame-rate and visual quality" in terms of visual appearance and physical interactions. Extending the same frame-rate and visual quality into the online gaming arena introduces additional challenges. To produce the desired frame-rate and visual quality, a game console 102 simulates each vehicle 126, which is being directed by a controller 104 (of FIGS. 1 and 2) thereof, as well as the overall environment. However, the resources of game console 102 are taxed too greatly to simulate eight vehicles 126, much less forty vehicles 126, while simultaneously maintaining the same level of frame-rate and visual quality.

One approach is to have each game console 102 simulate its local vehicles 126 for each frame and then to transmit the entirety of the simulated vehicle information for each frame to all other game consoles 102 across network 116. Unfortunately, constraints due to latency 302 render this approach untenable. Latency 302 can reflect a maximum bandwidth, network link delays, network limitations generally, some combination thereof, and so forth. By the time current simulated vehicle information is received and/or assimilated at a remote game console 102, the simulated vehicle information is no longer current and is therefore useless.

Sending the current positions is also untenable. Remote game consoles 102 can run a simulation from an old time up to the current time, but this consumes significant processing power when there are many vehicles 126. Game consoles 102 can also merely display remote vehicles 126 at past positions, but this leads to the interaction of vehicles 126 being different (i.e., player A thinks she is in front of player B, but player B thinks he is in front of player A).

As another example, five vehicles 126 and five game consoles 102 may be involved in a joint racing game. In this hypothetical, each game console 102 receives a current position of remote vehicles 126 and simulates them to present them visually. The resource cost per console is: one real-time simulation (for the local vehicle) plus four simulations that entail simulating from some time in the past to the present time upon every receipt of a new packet; this thus adds four real time simulations. However, with an implementation as described herein, instead of each game console 102 having to perform a simulation on all five vehicles 126, each game console 102 performs a full physics simulation on one vehicle 126 and performs four interpolations. Consequently, the resource cost per console is: one long simulation plus four interpolations.

With reference to FIG. 3, local game console 102(1) uses predictor 304 to predict a future predicted vehicle state 310 for each of vehicles 126(1-a), 126(1-b), 126(1-c), and 126(1-d) from current vehicle states 308. These predicted vehicle states 310 are transmitted from local game console 102(1) to remote game console 102(2) via network 116 with regard to latency 302. In other words, predicted vehicle states 310 are sufficiently in the future such that when they arrive at remote game console 102(2), there is adequate time to utilize them before they become outdated even with latency 302.

Specifically, remote game console 102(2) uses interpolator 306 to interpolate new current (e.g., current with respect to remote game console 102(2)) or interpolated vehicle states 312 using predicted vehicle states 310. Interpolated vehicle states 312 are then used to represent vehicles 126(1-a), 126(1-b), 126(1-c), and 126(1-d) on screen 118(2). Similarly, game console 102(2) determines predicted vehicle states 310 for vehicles 126(2-a), 126(2-b), 126(2-c), and 126(2-d), which are sent to game console 102(1). Game console 102(1) uses these predicted vehicle states 310 to determine interpolated vehicle states 312 that are used to depict vehicles 126(2-a), 126(2-b), 126(2-c), and 126(2-d) on display screen 118(1).

Thus, when playing in a networked game mode, vehicles are synchronized based on predictions of the future state of each vehicle that is being simulated on each device. Each "remote" device, rather than simulating all of the involved vehicles, interpolates the states of the remote vehicles based on predicted vehicle states. The device resource cost of interpolating the vehicle state versus simulating the vehicle state is approximately $1/1000^{th}$ for some games.

Because described implementations utilize interpolation times and predicted times, the clocks are synchronized across the devices; otherwise, the interpolation fails when the time exceeds the bounds of the interpolation. Because some network links may be asymmetric, traditional time synchronization methods can result in device time synchronizations being in error by some amount. A described implementation therefore synchronizes the time base based on "average interpolant values".

"Average interpolants" are values derived responsive to interpolation-related times and timings. "Expected average interpolants" are those interpolant values determined by a local device that is also determining related predicted vehicle states for a vehicle. "Actual average interpolants" are those interpolant values determined by a remote device that is also determining related interpolated vehicle states from the predicted vehicle states received from the local device for the vehicle. These values are described further below with particular reference to FIGS. 9 and 10. In short, a device simulating a vehicle sends an expected average interpolant to each remote device along with a predicted vehicle state for the vehicle. By setting a "per-link" time bias for each remote device, the expected average interpolant and the actual average interpolant can be effectively equalized.

This expected average interpolant versus actual average interpolant scheme produces good vehicle state synchronization among devices. It is relatively immune to clock drift, and it is somewhat resistant to asymmetric link characteristics. The scheme facilitates a superior frame-rate and visual quality for e.g. racing games even with a large number of remote cars participating in a shared gaming experience over various and/or varying link conditions. The scheme also compensates for clock drift between devices, so longer races can be completed without loss of synchronization, and synchronization errors due to clock discrepancies are masked.

Figure 4:
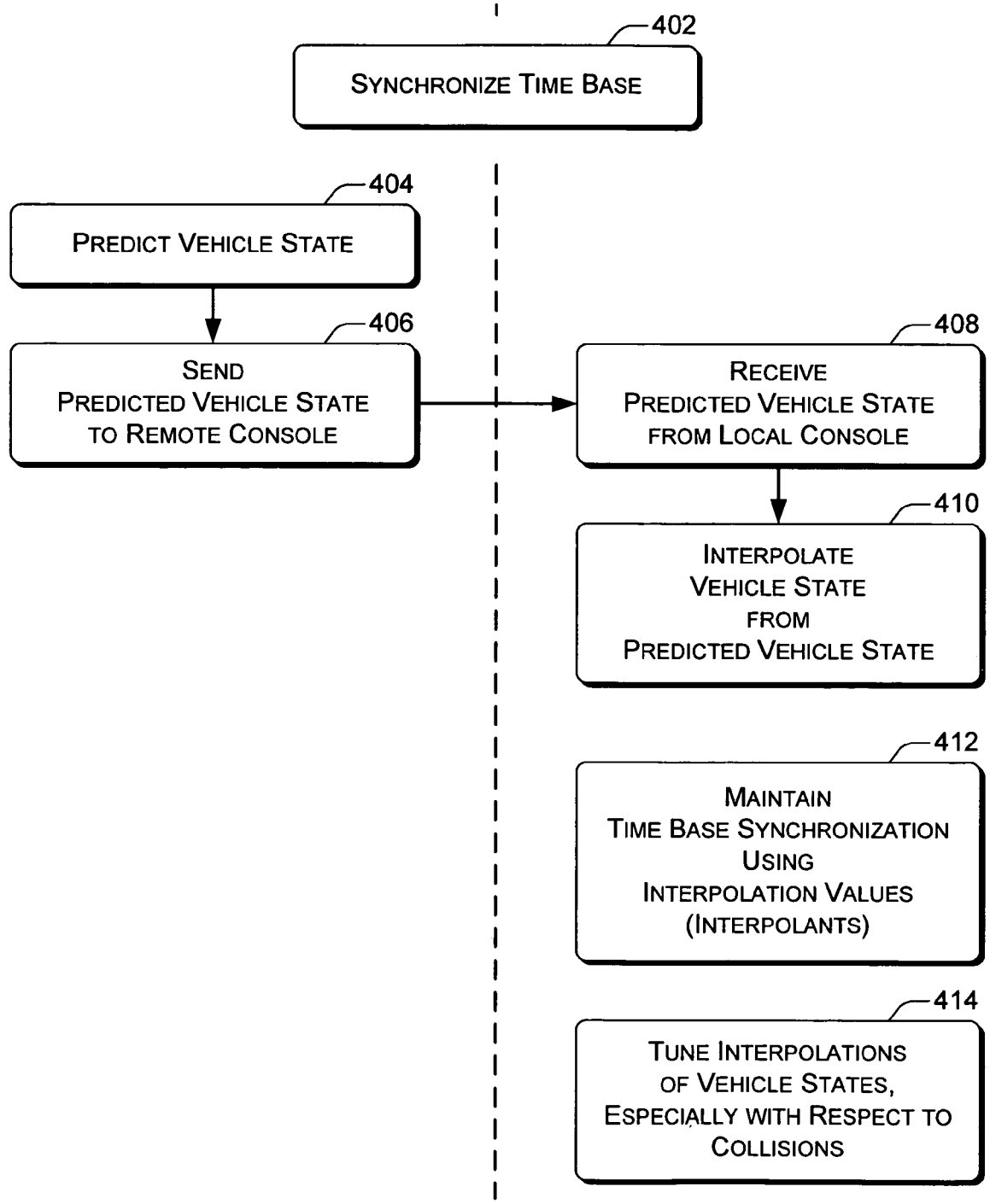
FIG. 4 is a flow diagram that illustrates exemplary schemes and techniques for coordinating multiple vehicles across a network.

FIG. 4 is a flow diagram 400 that illustrates exemplary schemes and techniques for coordinating multiple vehicles across a network. Flow diagram 400 includes seven (7) blocks 402-414. Although the actions of blocks 402-414 may be performed in other implementations and environments, FIGS. 1-3 are used in particular to illuminate certain aspects of the schemes and techniques. For example, the actions of flow diagram 400 may be performed by a host/local game console 102(1) and a remote game console 102(2). Specifically, the actions of blocks 402-406 may be performed fully or partially by host/local game console 102(1), and the actions of blocks 402 and 408-414 may be performed by remote game console 102(2).

At block 402, a time base is synchronized. For example, a joint time base may be synchronized between host/local game console 102(1) and remote game console 102(2), with host/local game console 102(1) controlling the time base as the designated host. Block 402 is described further below with particular reference to FIG. 5.

At block 404, a vehicle state is predicted. For example, a predicted vehicle state 310(1-$d$) for a vehicle 126(1-$d$) may be predicted on a step-by-step basis by host/local game console 102(1) using predictor 304. Block 404 is described further below with particular reference to FIGS. 6 and 7, including a physics engine 404B that illustrates parameters for an exemplary vehicle state.

At block 406, a predicted vehicle state is sent to a remote console. For example, host/local game console 102(1) may send predicted vehicle state 310(1-$d$) to remote game console 102(2). At block 408, the predicted vehicle state is received from the local console. For example, remote game console 102(2) may receive predicted vehicle state 310(1-$d$) from host/local game console 102(1).

At block 410, a vehicle state is interpolated from the received predicted vehicle state. For example, an interpolated vehicle state 312(1-$d$) for vehicle 126(1-$d$) may be interpolated from predicted vehicle state 310(1-$d$) by remote game console 102(2) using interpolator 306. Blocks 406, 408, and 410 (and block 404) are described further below with particular reference to FIG. 8.

At block 412, the time base synchronization is maintained using interpolation values (e.g., interpolants). For example, remote game console 102(2) may maintain the time base synchronization achieved with host/local game console 102(1) (at block 402) by instituting a time bias for vehicle state communications received from host/local game console 102(1). The time base synchronization is maintained using interpolants received from host/local game console 102(1) along with predicted vehicle states 310. Block 412 is described further below with particular reference to FIGS. 9 and 10.

At block 414, interpolations of vehicle states are tuned, especially with respect to collisions of vehicles. For example, the depiction of vehicle 126(1-$d$) on display screen 118(2) is tuned at least when vehicle 126(1-$d$) is involved in a collision. Such tunings may address glancing collisions, dragging collisions, and damage incurred during collisions. Block 414 is described further below with particular reference to FIGS. 11-14, with FIGS. 12, 13, and 14 being directed to glancing collisions, dragging collisions, and collision-related damage, respectively.

Vehicle State Prediction/Interpolation and Time Base Synchronization

Figure 5:
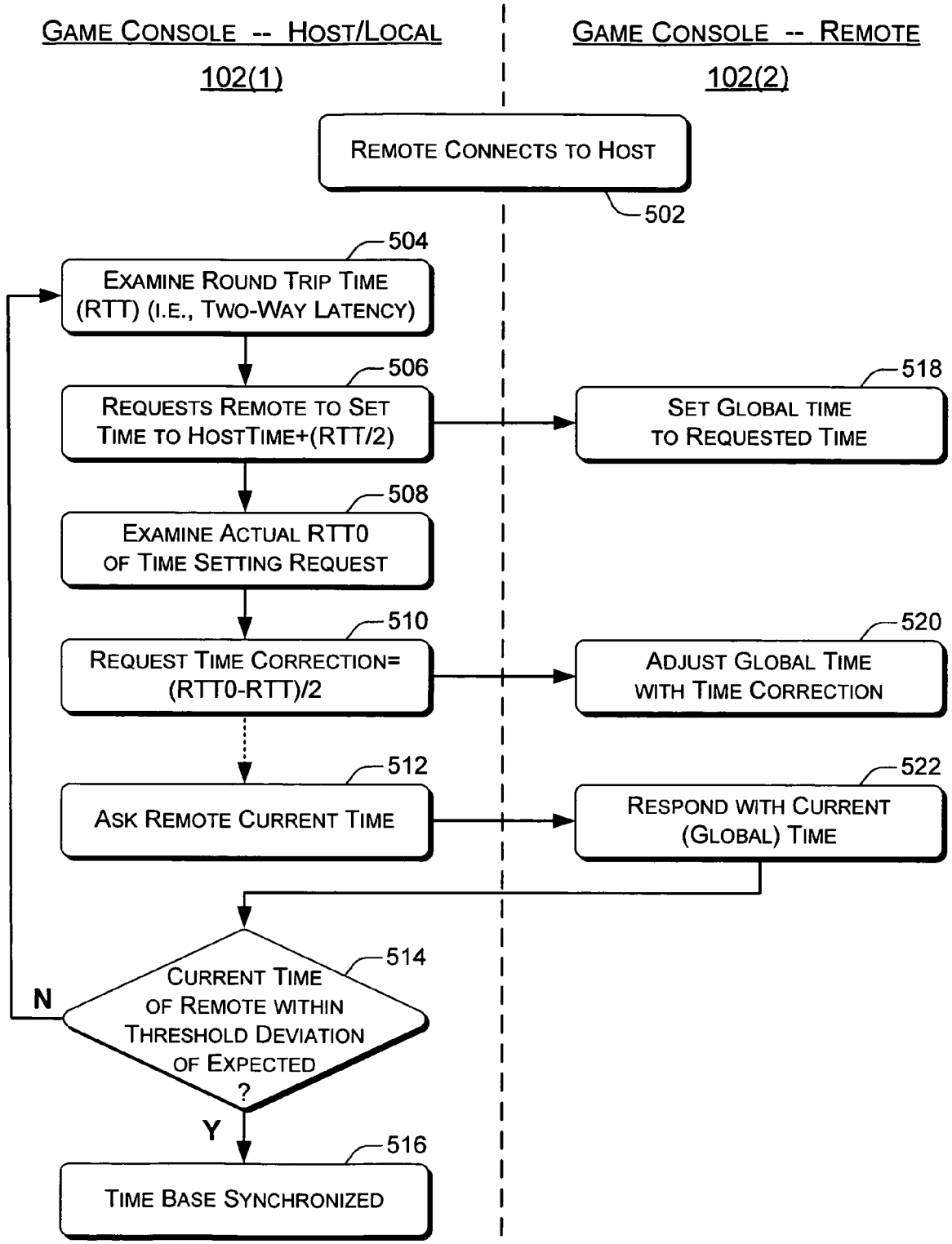
FIG. 5 is a flow diagram that illustrates an exemplary technique for synchronizing a time base among two or more gaming systems.

FIG. 5 is a flow diagram 402 that illustrates an exemplary technique for synchronizing a time base among two or more gaming systems 100. Flow diagram 402 includes eleven (11) blocks 502-522. Although the actions of blocks 502-522 may be performed in other implementations and environments, FIGS. 1-4 are used in particular to illuminate certain aspects of the technique. For example, the actions of blocks 502-516 may be performed fully or partially by host/local game console 102(1), and the actions of blocks 502 and 518-522 may be performed by remote game console 102(2).

In a described implementation, with networked gameplay, connections between devices participating in the game are peer to peer. In other words, devices involved in the game communicate directly to one another through either a local LAN, the internet, etc. As part of the game establishment process, participating devices connect to a device that is designated to be the host. The host may register his/her address with, for example, a matchmaking service such as XBOX® Live™, or would-be participants may simply broadcast on a local LAN to discover hosts. As remote devices connect to the designated host device, their time bases are synchronized using the following exemplary technique.

At block 502, a remote device connects to a host device. For example, remote game console 102(2) may connect to host game console 102(1). As described above, this connection may be effectuated (i) directly console-to-console or indirectly via one or more networks and (ii) with wired and/or wireless communications.

At block 504, the round trip time (RTT), which is double the latency, is examined by the host device. For example, host game console 102(1) may examine the RTT to remote game console 102(2). For instance, the RTT may be provided from an external component (e.g., an underlying layer) on host game console 102(1) to a gaming component, including e.g. predictor 304 and/or interpolator 306. With an XBOX® implementation for example, the round trip time is constantly monitored by the DirectPlay™ 8 networking layer, which may be linked to the game. The DirectPlay 8 networking layer maintains a running average of round trip times/latency samples during normal network operation; this running average can be queried at any time by the game. Additionally, DirectPlay 8 can provide a client (e.g., the game) with individual round trip data for any given message, which may be utilized in block 508 as RTT0.

At block 506, the host device requests the remote device to set the time at the remote device to equal the host time plus the RTT divided by 2. For example, host game console 102(1) may instruct remote game console 102(2) to set its time to the HostTime+(RTT/2). This accounts for the RTT/2 time period for the time-setting request message to arrive at remote game console 102(2); consequently, when the request message is received, it contains the current time at host game console 102(1).

At block 518, a global time of the remote device is set equal to the requested time as requested by the host device. For example, a global time at remote game console 102(2) may be set equal to HostTime+(RTT/2) as stipulated in the time-setting request message from host game console 102(1).

At block 508, the host device examines the actual RTT0 from the time-setting request message. For example, host game console 102(1) may examine the actual round trip latency (RTT0) of the request message sent earlier (at block 506).

At block 510, a time correction is determined responsive to half the difference between the original examined RTT and the actual RTT0, and the host device requests the remote device to adjust its global time accordingly. For example, host game console 102(1) may calculate a time correction that is equal to (RTT0-RTT)/2 and send a time correction request message to remote game console 102(2).

At block 520, the remote device adjusts its global time in accordance with the time correction received in the time correction request message from the host device. For example, remote game console 102(2) may add the (possibly negative) time correction value to the global time of remote game console 102(2).

Subsequently, at block 512, the host device asks the remote device for the current time. For example, host game console 102(1) may ask remote game console 102(2) for its current global time by sending thereto a current time request message. At block 522, the remote device responds to the host device with the current global time. For example, remote game console 102(2) sends its current global time back to host game console 102(1).

At block 514, it is determined by the host device if the current time of the remote device is within a threshold deviation of the expected time. For example, host game console 102(1) may determine if the time returned from remote game console 102(2) is within a threshold deviation of the expected time, where the expected time is the HostTime+RTT/2. Although other values may be used, an exemplary value for the threshold deviation is a 32 millisecond interval. An exemplary range for the threshold deviation is 0 to 50 milliseconds.

If the current time of the remote device is within a threshold deviation of the expected time (as determined at block 514), then the time base is considered synchronized at block 516. For example, the time base between host game console 102(1) and remote game console 102(2) may be considered synchronized. If, on the other hand, the current time of the remote device is not within a threshold deviation of the expected time, then the technique repeats from block 504.

Although a single iteration is usually sufficient to meet the threshold deviation, the setting, correcting, and checking process is repeated up to five iterations. However, a different number of maximum iterations may alternatively be used. If five or a different number of maximum iterations have been completed without achieving the desired accuracy, the synchronization is nevertheless considered acceptable, with the expectation that the clock drift compensation (as described further below with reference to FIGS. 9 and 10) can ensure a satisfactory multi-player network gaming experience. Hence, the technique of flow diagram 402 establishes the "global" time base for the participating game consoles 102, and the clock drift compensation establishes a per-link time bias for interpolating between predictions.

As described above, each device connects with the designated host device to establish a synchronized time base. Participating devices also establish links with each other for the game. Once the links are established and the game is started, each device runs a physics simulation of its own local vehicles and optionally a number of non-player vehicles (i.e., simulated/AI competitors). Each local vehicle may be simulated using a relatively detailed simulation. Additionally, a prediction is made into the future for each local vehicle. That prediction is sent over the network to the remote devices.

In order for the prediction to be useful to the targeted remote devices, it must be far enough in the future such that the actual running time of the game does not reach the prediction time until a new prediction further in the future is received at the targeted remote devices. Because of this factor and because making many predictions is resource intensive, the worst case (e.g., the longest) prediction is made for each vehicle. Because the prediction is costly (due to use of the simulation engine) and because there are bandwidth constraints on sending data, updated predictions are typically not sent every frame. A described implementation therefore builds each prediction over multiple frames, depending on the communication latency and bandwidth of the links between the devices.

Figure 6:
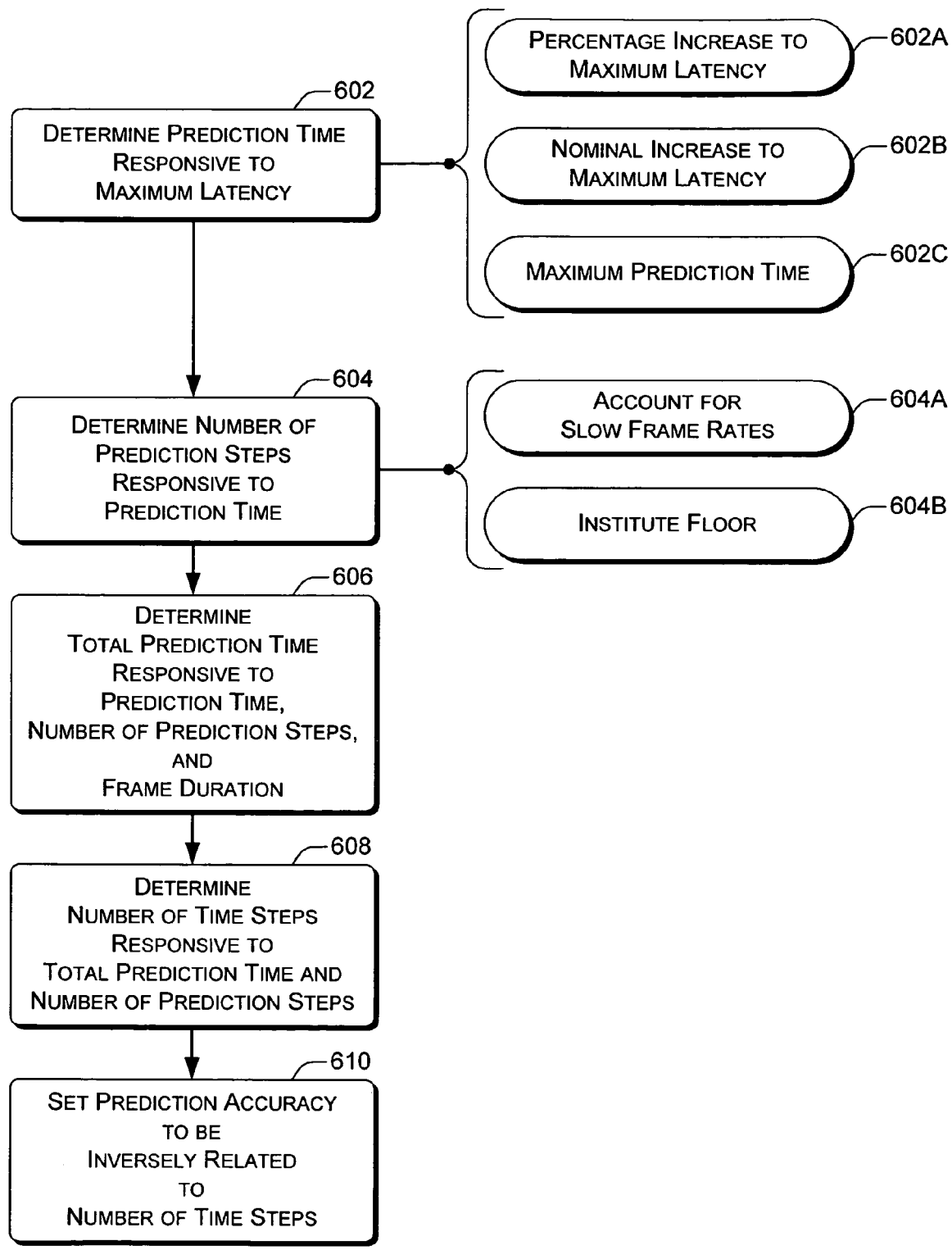
FIG. 6 is a flow diagram that illustrates an exemplary scheme for determining prediction-related parameters.

FIG. 6 is a flow diagram 404A that illustrates an exemplary scheme for determining prediction-related parameters. Flow diagram 404A includes five (5) major blocks 602-610. Although the actions of blocks 602-610 may be performed in other implementations and environments, FIGS. 1-4 are used in particular to illuminate certain aspects of the scheme. For example, the actions of blocks 602-610 may be performed by a participating device that knows the maximum latency, including a host/local game console 102(1).

At block 602, a prediction time is determined responsive to a maximum latency. For example, the prediction time may be determined responsive to the greatest latency of the latencies between a given game console 102 and the other game consoles 102 that are to participate in a joint networked game.

Specifically, the prediction time may be determined (i) by setting the prediction time to equal the maximum latency as increased by a pre-selected percentage of the maximum latency (block 602A), (ii) by setting the prediction time equal to the maximum latency as increased by a pre-selected nominal amount (block 602B), (iii) by capping the prediction time at a pre-selected maximum prediction time (block 602C), by some combination or permutation thereof, and so forth. An exemplary approach for determining the prediction time responsive to the maximum latency is presented below in an exemplary formulaic implementation of flow chart 404A.

At block 604, a number of prediction steps is determined responsive to the prediction time. For example, a number of prediction steps, with each prediction step corresponding to a frame, may be determined responsive to the determined prediction time. Specifically, the number of prediction steps may be determined responsive to the determined prediction time while accounting for slow frame rates (block 604A) and while instituting a floor or minimum number of prediction steps (block 604B).

At block 606, a total prediction time is determined responsive to the prediction time, the number of prediction steps, and frame duration. For example, the total prediction time may be determined responsive to a sum of (i) the determined prediction time and (ii) a product of the number of prediction steps and the frame duration.

At block 608, a number of time steps is determined responsive to the total prediction time and the number of prediction steps. For example, the number of time steps may be determined responsive to a quotient between the determined total prediction time (from block 606) and the determined number of prediction steps (from block 604).

At block 610, a prediction accuracy is set to be inversely related to the number of time steps. For example, if the determined number of time steps is sufficiently high (i.e., if the prediction is being made sufficiently in the future), then the prediction accuracy may be lowered.

Although flow diagram 404A (of FIG. 6) may be implemented in other manners, an exemplary formulaic implementation is provided below:

nMaxLatency=g_PeerNet.GetMaxLatency( );
tPredict=nMaxLatency*3/2; //150% of latency
tPredict=min(tPredict, nMaxLatency+100);
tPredict=min(500,tPredict);
if(tFrame>17){
//don't want the update rate to drop below 6 times a second. When
//the frame rate is slow and the prediction time is long this could

```
//have happened. So when running at a low frame rate we
   do more
//prediction per frame, since as a fraction of the frame the
   prediction
//time will be small anyway.
m_nPredictionSteps=1+tPredict/200;
} else {
m_nPredictionSteps=1+tPredict/100;
}
if(m_nPredictionSteps<3) {
m_nPredictionSteps=3;
}
m_tTotal=tPredict+(m_nPredictionSteps*tFrame)+5*16;
m_ftStep=(((float)m_tTotal)/m_nPredictionSteps)/
(1000.0f);
   if(m_ftStep<60.0f){
   m_fInverseAccuracy=1.0f;
   } else {
   //drop accuracy when predicting more than 60 ms into the
      future,
   //cost of prediction reduced by 1/m_fInverseAccuracy
   m_fInverseAccuracy=2.0f;
   }
```

The above exemplary formulaic implementation determines how far into the future to make the prediction. The predictions are segmented over multiple frames, and the prediction is made with consideration for the worst case link (with an exemplary maximum acceptable latency of half a second). The prediction time is taken into account as part of the time that is predicted because the prediction cannot be sent until the prediction is complete.

Figure 7:
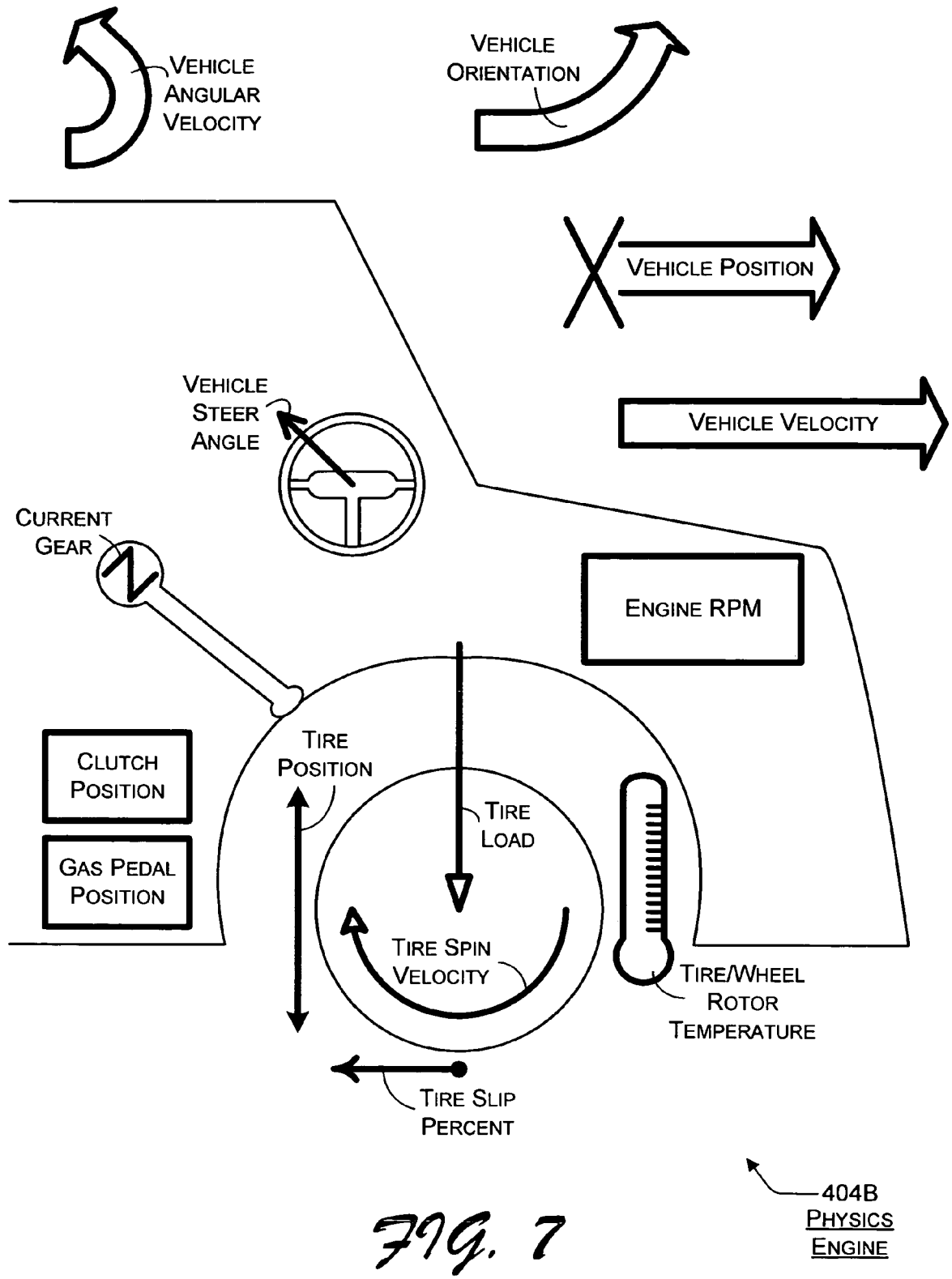
FIG. 7 is a vehicle illustrating exemplary physical parameters that can be generated by a physics engine for a predicted vehicle state.

FIG. 7 is a vehicle illustrating exemplary physical parameters that can be generated by a physics engine 404B for a predicted vehicle state 310. As described above with reference to flow diagram 404A of FIG. 6, predictions are made by running physics engine 404B over enough time steps to represent the time duration determined for the prediction. For example, if the time duration determined for a prediction is 300 milliseconds, and each step of physics engine 404B runs for 1/360th of a second of time simulation, physics engine 404B is then run for 108 steps.

An exemplary physics engine 404B predicts multiple physical parameters as part of predictor 304 for a vehicle 126 at a local game console 102(1). At a remote game console 102(2), interpolator 306 also interpolates each of the predicted physical parameters (if relevant) to create an interpolated vehicle state 312 in order to depict the vehicle 126 at an interpolated point.

The exemplary physical parameters, which are illustrated in FIG. 7, and their respective effects on the predictions and interpolations for vehicles are provided below:

Vehicle Position: Defines where vehicle is geographically/spatially (e.g., a location on a track or course).
Vehicle Velocity Used for smoothing out predictions—also used for audio Doppler.
Vehicle Orientation Defines vehicle's current rotation.
Vehicle Angular Velocity: Used for smoothing out predictions.
Tire Position: Defines visual suspension movement.
Tire Spin Velocity: Defines how fast the tire is rolling.
Tire Slip Percent: Defines how much grip the tire is getting—used for graphics effects (e.g., skids, tire-smoke, etc.).
Tire Load Defines how much weight is currently on the tire—used for graphics effects (e.g., skids, tire-smoke, etc.).
Tire/Wheel Rotor Temperature: Used for graphics effects—such as glowing brake rotor.
Engine RPM: Used by audio to define current engine audio.
Vehicle Steer Angle: Used for defining the steered wheel positions.
Current Gear Used by audio to define current engine audio.
Clutch Position Used by audio to define current engine audio.
Gas Pedal Position: Used by audio to adjust engine audio.

Values for one or more and possibly all of these physical parameters are predicted by physics engine 404B for a predicted vehicle state 310 (of FIG. 3). Predicted vehicle state 310, after transmission from a local game console 102(1) to a remote game console 102(2), is used to produce an interpolated vehicle state 312, which includes interpolated versions of these physical parameters. The interpolated versions of these physical parameters are then used by remote game console 102(2) to depict the associated vehicle 126 on a display screen 118(2) coupled thereto.

Figure 8:
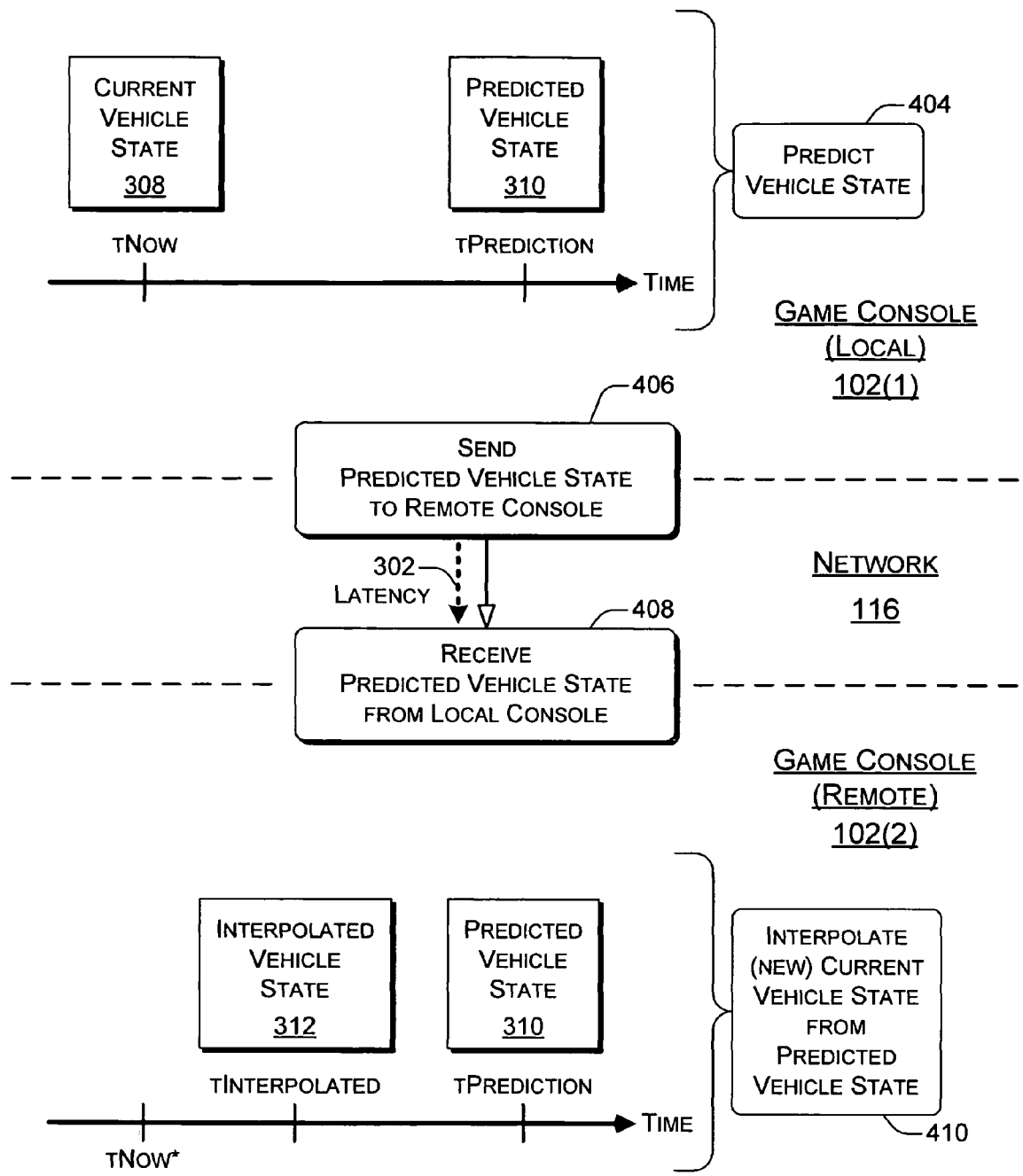
FIG. 8 is an exemplary block diagram that illustrates predicted and interpolated vehicle states from a temporal perspective as well as transmission of a predicted vehicle state from a local game console to a remote game console.

FIG. 8 is an exemplary block diagram 800 that illustrates a predicted vehicle state 310 and an interpolated vehicle state 312 from a temporal perspective as well as transmission of predicted vehicle state 310 from a local game console 102(1) to a remote game console 102(2). Although the actions of the illustrated blocks may be performed in other implementations and environments, FIGS. 1-4 are used in particular to illuminate certain aspects of the process. For example, block diagram 800 is divided into three areas: local game console 102(1), network 116, and remote game console 102(2).

At block 404, a vehicle state is predicted by a local device. Specifically, predicted vehicle state 310 at time equal to tPrediction is derived via prediction (e.g., using predictor 304) by local game console 102(1) from current vehicle state 308 at time equal to tNow.

At block 406, the predicted vehicle state is sent from the local device to a remote device. Specifically, predicted vehicle state 310 is sent from local game console 102(1) to remote game console 102(2) over network 116. The transmission time from local game console 102(1) to remote game console 102(2) is the communication latency 302. At block 408, the predicted vehicle state is received at the remote device from the local device. Specifically, predicted vehicle state 310 is received from local game console 102(1) at remote game console 102(2) via network 116.

At block 410, the new current vehicle state (i.e., the interpolated vehicle state) is interpolated at the local device from the predicted vehicle state. Specifically, interpolated vehicle state 312 at time equal to tInterpolated is derived via interpolation (e.g., using interpolator 306) by remote game console 102(2) from predicted vehicle state 310 at time equal to tPrediction.

Interpolation may be accomplished on a linear basis or on a higher-order (e.g., quadratic, cubic, etc.) basis. Examples include a linear equation, a spline for position, a hermite curve for position and velocity, a squad function for (rotational) orientation, and so forth. However, in an implementation described herein, particularly with reference to FIG. 12, a higher-order cubic interpolation is utilized. Specifically, a hermite curve is used for interpolating the position and velocity of vehicles, and a squad function is used for interpolating the orientation and angular velocity of vehicles.

A new current time for the new current vehicle state corresponds to the interpolated time of interpolated vehicle state 312. The new current time is the new current time at the remote device. The "tNow*" time marked on the timeline in conjunction with block 410 corresponds to the original "tNow" time marked on the timeline in conjunction with block 404 at which local game console 102(1) initiated the vehicle state prediction.

When each predicted vehicle state 310 is sent to each remote device from a local device, an expected average interpolant is also sent. When a remote device is rendering the vehicle 126 associated with the predicted vehicle state 310 at a particular time, the remote device interpolates between (i) the vehicle's (new) current state and time at the remote device and (ii) the vehicle's predicted state and time. Because the remote device depicting vehicle 126 has knowledge of the link latency 312 between the local and remote devices, the remote device can ascertain an actual average interpolant.

Figure 9:
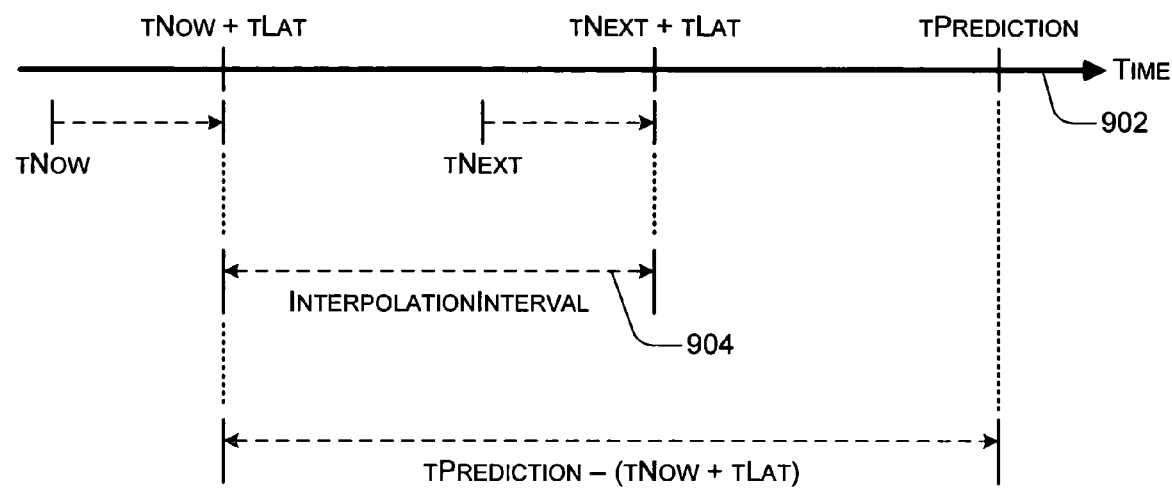
FIG. 9 is an exemplary latency time chart that illustrates an interpolation interval.

FIG. 9 is an exemplary latency time chart 412A that illustrates an interpolation interval 904. Timeline 902 includes three time points marked thereon. These time points include "tNow+tLat", "tNext+tLat", and "tPrediction". At time equal to tNow, a predicted vehicle state 310 (not shown in FIG. 9) corresponding to tPrediction is sent from a local game console 102(1) to a remote game console 102(2) (see FIG. 8). Predicted vehicle state 310 arrives at remote game console 102(2) at tNow+tLat, where tLat equals the latency period. At time equal to tNext, a subsequent predicted vehicle state 310 corresponding to a subsequent tPrediction (not shown) is sent from local game console 102(1) to remote game console 102(2). The subsequent predicted vehicle state 310 arrives at remote game console 102(2) at tNext+tLat.

Interpolation interval 904 is defined to be the period between tNow+tLat and tNext+tLat. In other words, interpolation interval 904 is the period between the arrival of successive predicted vehicle states 310. Also indicated in conjunction with timeline 902 is a period marked "tPrediction−(tNow+tLat)".

In operation, a predicted vehicle state for time tPrediction is sent from a local device at tNow, and the predicted vehicle state arrives at a remote device at tNow+tLat. After receipt of the predicted vehicle state, the remote device begins interpolating the state of the vehicle between the vehicle's current state at tNow+tLat until a new predicted vehicle state for tNext arrives at tNext+tLat.

From timeline 902, it is apparent that the remote device is to interpolate over the time period between tNow+tLat and tPrediction during the time interval tNow+tLat to tNext+tLat (i.e., interpolation interval 904). Thus, the average interpolant can be computed from equation (1) below:

$$AverageInterpolant = \frac{\left(\frac{InterpolationInterval}{2}\right)}{(tPrediction - (tNow + tLat))}. \quad (1)$$

After substituting "(tNext+tLat)-(tNow+tLat)" for the "InterpolationInterval", equation (2) below results:

$$AverageInterpolant = \frac{\left(\frac{((tNext + tLat) - (tNow + tLat))}{2}\right)}{(tPrediction - (tNow + tLat))}. \quad (2)$$

After mathematical manipulation, equation (2) reduces to equation (3) below:

$$AverageInterpolant = \frac{(tNext - tNow)}{2 \times (tPrediction - (tNow + tLat))}. \quad (3)$$

An expected average interpolant, which is an average interpolant determined by the local device simulating the vehicle, is sent along with each predicted vehicle state to each remote device. Each remote device gathers statistics on its interpolant values and maintains a running average of actual interpolants. Each remote device also maintains a running average of the local-determined expected average interpolant. When the expected average interpolant from the local device and the actual average interpolant of the remote device diverge, the time base for the link between the two is adjusted so that the expected average interpolant and the actual average interpolant converge. This per-link time base adjustment is then applied to predicted vehicle states arriving via the corresponding link.

Figure 10:
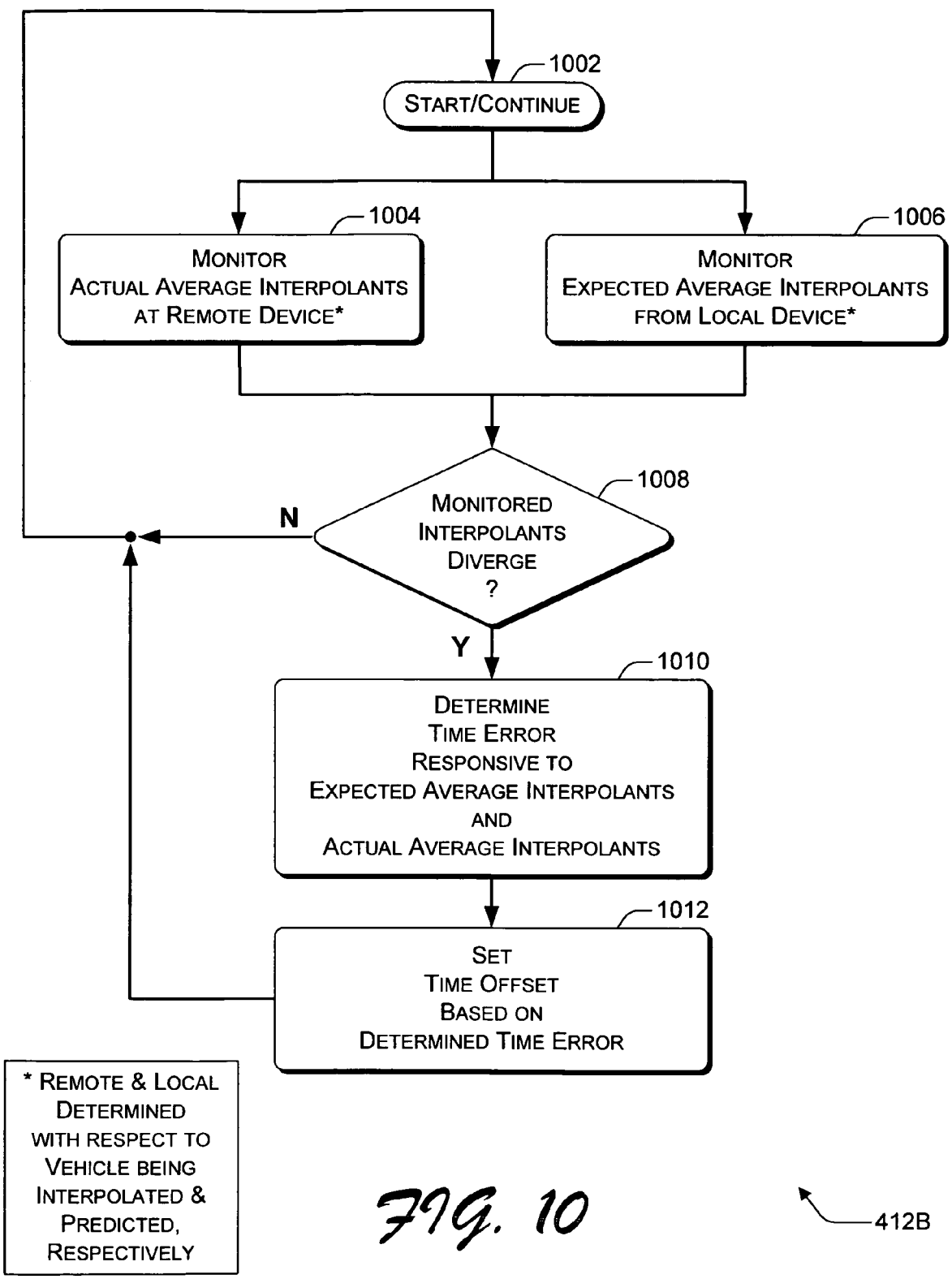
FIG. 10 is a flow diagram that illustrates an exemplary technique for maintaining a time base synchronization.

FIG. 10 is a flow diagram 412B that illustrates an exemplary technique for maintaining a time base synchronization. Flow diagram 412B includes six (6) blocks 1002-1012. Although the actions of blocks 1002-1012 may be performed in other implementations and environments, FIGS. 1-4 and 9 are used in particular to illuminate certain aspects of the technique. For example, the actions of blocks 1002-1012 may be performed by a remote game console 102(2) with respect to a local game console 102(1) from which predicted vehicle states 310 and expected average interpolants are being received.

At block 1002, the technique for maintaining a time base synchronization is started. The actions of blocks 1004 and 1006 may optionally be performed fully or partially simultaneously.

At block 1004, actual average interpolants as ascertained at the remote device are monitored. At block 1006, expected average interpolants as ascertained at the local device are monitored. These expected average interpolants are received at the remote device from the local device along with predicted vehicle states.

Remote device versus local device is determined with respect to whether a particular vehicle is being interpolated or predicted. In other words, with regard to this exemplary technique for maintaining a time base synchronization, the local device is the device predicting the predicted vehicle state, and the remote device is the device interpolating the interpolated vehicle state from the predicted vehicle state as well as the device performing the technique.

At block 1008, it is determined whether the actual average interpolants diverge from the expected average interpolants, or vice versa. If not, the technique for maintaining a time base synchronization continues at block 1002.

If, on the other hand, it is determined (at block 1008) that the actual average interpolants and the expected average interpolants have diverged, then a time error is determined responsive to the expected average interpolants and the actual average interpolants at block 1010. For example, the time error may be determined responsive to the difference between the expected average interpolants and the actual average interpolants.

At block 1012, a time offset is set based on the determined time error. This time offset is then applied to a synchronized time base (e.g., as established by the exemplary technique of flow diagram 500 (of FIG. 5)) to establish a per-link time bias. The technique for maintaining the time base synchronization then continues at block 1002.

Although flow diagram 412B of FIG. 10 may be implemented in other manners, an exemplary formulaic implementation is provided below:

```
void CConn::AdjustTimeBaseForInterpolant( )
{
//note: m_InterpolantInterval is (tPrediction–(tNow+tLat)) in milliseconds
    float AvgLocalInterpolant=m_AvgInterpolant/c_Interpolants;
    float AvgExpectedInterpolant=
        m_AvgExpectedAvgInterpolant/c_AvgInterpolants;
    int msTimeError=(AvgExpectedInterpolant–avgLocalInterpolant)
        *m_InterpolantInterval*1000;
    m_dwTimeOffset+=msTimeError;
}
```

Interpolation Tuning

As described above, a predicted vehicle state is determined for each local vehicle at a local device, and the predicted vehicle state is sent to remote devices. Remote devices render such vehicles, which are local vehicles to the predicting device and remote vehicles to the remote devices, by interpolating the vehicle state of the vehicle between the vehicle's current state on the remote device and the received predicted vehicle state. Unfortunately, the process of interpolation can lead to some difficulties in providing an accurate reflection of what actually happened to the vehicle between its current state on the remote device and the received predicted vehicle state.

Three cases are specifically addressed herein below:
1. glancing collisions with the environment;
2. dragging collisions with the environment; and
3. realizing remote car damage from a collision.

In each of these cases, a predicted vehicle state may occur after the collision event. Consequently, without any special intervention, the remote device interpolates the vehicle from its current state to a new "post-collision" state without causing any collision to occur (or even realizing/recognizing that one should occur or has already occurred). As a result, no damage is applied to the vehicle, and there are no sounds, sparks, or other effects resulting from the collision event.

FIG. 11 is a block diagram of an exemplary interpolation tuner 414' for addressing glancing collisions, dragging collisions, and remote vehicle damage. Interpolation tuner 414' may be implemented as part of interpolator 306 (of FIG. 3). Specifically, interpolation tuner 414' includes a glancing collisions handler 414A, a dragging collisions effectuator 414B, and a remote vehicle damage agent 414C. Glancing collisions handler 414A is described further below with reference to FIG. 12, dragging collisions effectuator 414B is described further below with reference to FIG. 13, and remote vehicle damage agent 414C is described further below with reference to FIG. 14.

Figure 12:
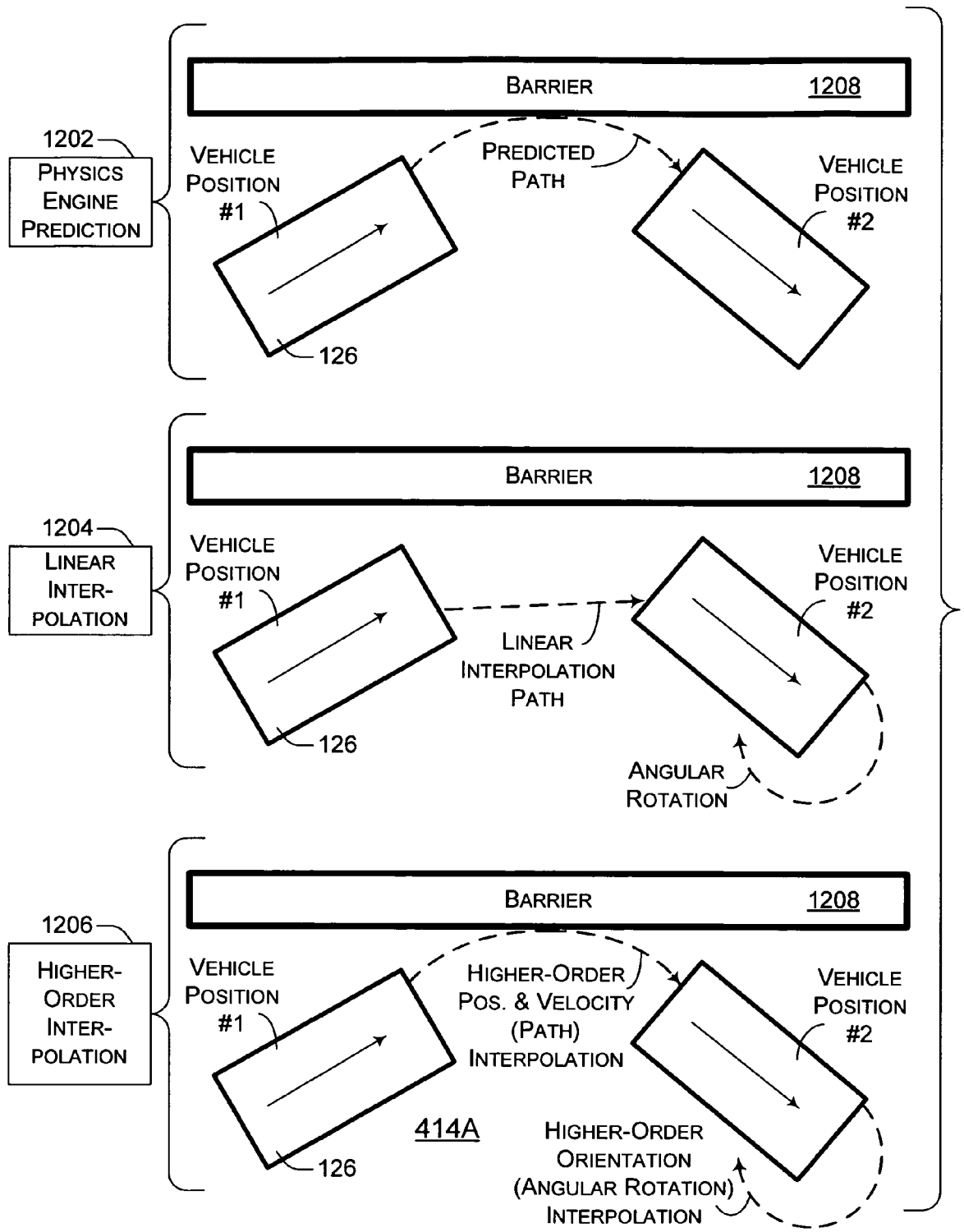
FIG. 12 is a block diagram illustrating an exemplary scheme for handling glancing collisions in an interpolation environment.

FIG. 12 is a block diagram illustrating an exemplary scheme for handling glancing collisions in an interpolation environment. Specifically, glancing collisions handler 414A is shown with regard to higher order interpolation 1206, as is described below.

For a case of a glancing collision, assume a vehicle is headed at a barrier with a 30 degree angle of incidence. The vehicle is likely traveling very fast, and after impacting the barrier, it bounces off at some other angle, which is assumed to be a 20 degree angle in this hypothetical. If the vehicle is moving very fast, such a collision is quite catastrophic, so it creates a loud noise and sparks and results in significant damage to the vehicle.

If the only communication between devices is the transmission of the predicted vehicle state, the likelihood that the prediction specifically indicates affects of the collision event is rather small. Despite the magnitude of the collision and its terrific effects, the actual duration of the collision is very small, typically on the order of tens of milliseconds. If the predicted vehicle state corresponds to a time after the collision, the remote devices have no easy way to distinguish between whether the associated vehicle turns and misses the barrier and whether the vehicle is involved in a collision event. Consequently, instead of a spectacular glancing collision, the vehicle appears to merely turn and miss the barrier.

A physics engine prediction 1202 is shown at the top third of FIG. 12. A (remote) vehicle 126 is illustrated as being involved in a collision event with a barrier 1208. A vehicle position #1 and a vehicle position #2 are depicted for vehicle 126. Physics engine prediction 1202 includes a predicted path that is curved between the two vehicle positions as vehicle 126 impacts barrier 1208 and deflects therefrom.

Thus, in the diagram, vehicle position #1 is before the collision, and vehicle position #2 is after the collision. The arrows represent the velocity of vehicle 126 before (at position #1) and after (at position #2) the collision. If these #1 and #2 positions are part of successive predicted vehicle states that are sent to a remote device, the remote device does not know the exact path taken from vehicle position #1 to vehicle position #2.

If, for example, linear interpolation is used, vehicle 126 appears to slide from vehicle position #1 to vehicle position #2 with angular rotation but without a collision with barrier 1208. Such a linear interpolation 1204 is shown in the middle third of FIG. 12. Instead of tracking the predicted path from physics engine prediction 1204, vehicle 126 tracks a linear interpolation path from vehicle position #1 to vehicle position #2. The remote device rendering vehicle 126 also causes vehicle 126 to engage in an angular rotation. This does not accurately reflect the actual behavior of vehicle 126.

Therefore, instead of a linear interpolation, a higher-order interpolation is performed that can accurately reflect a nonlinear predicted path. A higher-order interpolation 1206 is shown at the bottom third of FIG. 12. The higher-order interpolation 1206 may be performed by glancing collisions handler 414A, as indicated. The higher-order interpolation path between vehicle position #1 and vehicle position #2 as achieved with higher-order interpolation 1206 does reflect the predicted path from physics engine prediction 1202. Using higher-order interpolation 1206, vehicle 126 is depicted on a display screen of the remote device as impacting and deflecting from barrier 1208.

More specifically, the higher-order interpolation 1206 enables accurate tracking for position, velocity, and orientation. In an exemplary implementation, a cubic higher-order interpolation 1206 is employed. For position and velocity, a Hermite curve is employed to realize the higher-order interpolation 1206. A Hermite curve ensures that the motion of the vehicle follows a continuous curve in position and velocity. As a result of using a Hermite curve interpolation, the interpolated path takes the vehicle into and away from the barrier in a smooth curve, which provides an opportunity to provide collision effects. For rotational orientation, a squad function is employed to realize the higher-order interpolation 1206.

In any given implementation, a cubic interpolation may be employed for position and/or velocity (e.g., using a Hermite curve) while a linear interpolation is employed for orientation. Alternatively, a cubic interpolation may be employed for orientation (e.g., using a squad function) while a linear interpolation is employed for position and/or velocity. In a described implementation, however, a cubic interpolation is employed for position, velocity, orientation, and angular velocity.

In a described squad function implementation, four quaternions and one interpolant are used as its input parameters: Squad(q1, q2, q3, q4, t). The behavior of a squad function is defined as: Slerp(Slerp(q1, q4, t), Slerp(q2, q3, t), 2t(1-t)). In other words, the squad function uses a linear quaternion interpolation to perform the operation of the cubic quaternion interpolation. In pseudo code, it can be described as:

TmpQuat1=Slerp(q1, q4, t)//linearly interpolate two endpoints
TmpQuat2=Slerp(q2, q3, t)//linearly interpolate two midpoints
RetQuat=Slerp(TmpQuat1, TmpQuat2, 2*t*(1-t))//linearly interpolate two previous quats
return RetQuat Thus, the endpoints are known—q1 is the current orientation, and q4 is the goal orientation. Two intermediate orientations, q2 and q3, are next calculated such that Squad( ) provides a smooth interpolation. A smooth interpolation can be provided, for example, when the orientation and its time-derivative (i.e., its angular-velocity) are continuous. The desired angular-velocities at the endpoints—termed q1' and q4' are also known ahead of time. Hence, the next step is to calculate (q2, q3) from (q1, q1', q4, q4').

In pseudo code, the calculation of (q2, q3) from (q1, q1', q4, q4') can be described as:

CalcInterOrientQuats( )
{
//Initial data
  q1=starting quat
  q1'=angular velocity at q1 (at t=0)
  q4=ending quat
  q4'=angular velocity at q4 (at t=1)
//Calculate q2
  q2=quat assuming we start with orientation q1 and rotate with constant angular velocity, q1', for X amount of time.
  X=half of the amount of time from t=0 to t=1.
//Calculate q3
  q3=quat assuming we start with orientation q4 and rotate with constant angular velocity, -q4', for X amount of time.
  X=half of the amount of time from t=0 to t=1.
}

Although higher-order interpolation 1206 of glancing collisions handler 414A (of FIGS. 11 and 12) may be implemented in other manners, an exemplary formulaic implementation is provided below:

For using Hermite curves to interpolate position and velocity, the following exemplary formulaic algorithm may be employed:

void HermiteCurve(Vec3 &PI, Vec3 &TI, const Vec3 &P1, const Vec3 &T1, const Vec3 &P2, const Vec3 &T2, const f32 interpolant)
{
  float s,s2,s3;
  s=interpolant;
  s2=s*s;
  s3=s2*s;
  //calculate hermite co-effecients
  float h1=2*s3-3*s2+1;
  float h2=-2*s3+3*s2;
  float h3=s3-2*s2+s;
  float h4=s3-s2;
  //calculate the derivative hermite co-effecients
  float dh1=6*s2-6*s;
  float dh2=-6*s2+6*s;
  float dh3=3*s2-4*s+1;
  float dh4=3*s2-2*s
  //interpolate position
  PI=h1*P1+h2*P2+h3*T1+h4*T2;
  //interpolate velocity (tangent)
  TI=dh1*P1+dh2*P2+dh3*T1+dh4*T2;
}

For using squad functions to interpolate orientation, the following exemplary formulaic algorithm may be employed:

void SquadOrientation(
  Vec3 orientation[3],
  D3DXQUATERNION*pQ1,
  D3DXQUATERNION*pQ2,
  D3DXQUATERNION*pQ3,
  D3DXQUATERNION*pQ4,
  f32 interpolant)
{
  D3DXQUATERNION ResultOrientQuat;
  D3DXMATRIX mtx;
  Vec3 tmpPos;
  interpolant=max(interpolant, 0.00;
  interpolant=min(interpolant, 1.00;
  D3DXQuaternionSquad(&ResultOrientQuat, pQ1, pQ2, pQ3, pQ4, interpolant);
  //Calc the D3D mtx from the quat
  D3DXMatrixRotationQuaternion(&mtx, &ResultOrientQuat);
  //Calc the orientation from the D3D mtx
  OrientationPosCreateFromD3DMatrix(orientation, tmpPos, mtx);
}

For generating the two intermediate points of the squad function, the following exemplary formulaic algorithm may be employed:

//
//Generate Inter Orient Quats( )
// typedef struct D3DXQUATERNION
{
  FLOAT x, y, z, w;
} D3DXQUATERNION, *LPD3DXQUATERNION;

typedef struct_D3DXVECTOR3 {
  float x;
  float y;
  float z;
} D3DXVECTOR3;

void FixAxisAngle(D3DXVECTOR3*pAxis, f32*pAngle)
{
  if(*pAngle>D3DX_PI)
  {
    *pAngle-=2.0f*D3DX_PI;
  }
  else if(*pAngle<-D3DX_PI)
  {

```
    *pAngle+=2.0f*D3DX_PI;
    }
}
void                    SetQuaternionSensePositive
(D3DXQUATERNION*pQInOut)
{
    if(pQInOut->w<0.0f){
    pQInOut->x=-1*pQInOut->x;
    pQInOut->y=-1*pQInOut->y;
    pQInOut->z=-1*pQInOut->z;
    pQInOut->w=-1*pQInOut->w;
    }
}
void CCarRemote::GenerateInterOrientQuats( )
{
    D3DXMATRIX mtx;
    D3DXQUATERNION
Q0,Q0Inv,QA,QDInv,QrotOtoA,QTmp,QD,QrotHalfDA,
    QrotHalfDAInv,QHalfDerivA,   QHalfDerivD,QHalf-
DerivDInv,QB,QC;
    D3DXVECTOR3     QuatTmpAxis1,QuatTmpAxis2,
QuatTmpAxis3;
    float    QuatTmpAngle1,QuatTmpAngle2,QuatTm-
pAngle3;
    float AngVelA;
    float RotAngle;//rotation to 1/3 of distance between current
        position and prediction
    float    OneHalfTI=(1.0f/2000.00*(m_tNewPrediction-
m_tOldPrediction);
    float T0=(1.0f/1000.0f)*(m_tCurrentLerp-m_tLastLerp);
    //convert old recorded orientation to a Quaternion
    D3DMatrixCreateFromOrientationPos(mtx, m_LastOri-
        entation, Vec3MakeTemp(0.0f, 0.0f, 0.0f));
    D3DXQuaternionRotationMatrix(&Q0, &mtx);
    D3DXQuaternionInverse(&Q0Inv,&Q0);
    //convert current orientation to a Quaternion
    D3DMatrixCreateFromOrientationPos(mtx, m_CarDyn-
        .m_Orientation, Vec3MakeTemp(0.0f, 0.0f, 0.0f));
    D3DXQuaternionRotationMatrix(&QA, &mtx);
    //convert target orientation to a Quaternion
    D3DMatrixCreateFromOrientationPos(mtx, m_NewPre-
        diction.m_Orientation,  Vec3MakeTemp(0.0f, 0.0f,
        0.0f));
    D3DXQuaternionRotationMatrix(&QD, &mtx);
    D3DXQuaternionInverse(&QDInv,&QD);
    //Multiply the inverse of the old orientation by the new
orientation to get the
    //rotation delta quaternian (Qrot0toA)
    D3DXQuaternionMultiply(&Qrot0toA, &QA, &Q0Inv);
    NormalizeQuaternion (&Qrot0toA, &Qrot0toA);
    //Convert the Quaterian rotation to an QuatTmpAxis and
QuatTmpAngle
    D3DXQuaternionToAxisAngle(&Qrot0toA, &QuatTm-
        pAxis1, &QuatTmpAngle1);
    FixAxisAngle(&QuatTmpAxis1, &QuatTmpAngle1);
    //calculate the angular velocity over time by taking the
QuatTmpAngle component
    //divided by the time it took for that angular change, this is
the
    //magnitude of angular velocity
    if(m_tCurrentLerp-m_tLastLerp!=0){
    AngVelA=QuatTmpAngle1/T0;
    } else {
    AngVelA=0.0f;
    }
    //Calc quat that represents half the derivative (ang-vel) at
point A
    RotAngle=AngVelA*OneHalfTI;
    D3DXQuaternionRotationAxis(&QHalfDerivA,
        &QuatTmpAxis1, RotAngle);
    //Calc quat that performs the half-rotation of the derivative
(ang-vel) at point A
    D3DXQuaternionMultiply(&QTmp, &QA, &QDInv);
    NormalizeQuaternion(&QTmp, &QTmp);
    D3DXQuaternionToAxisAngle(&QTmp,     &QuatTm-
pAxis2, &QuatTmpAngle2);
    FixAxisAngle(&QuatTmpAxis2, &QuatTmpAngle2);
    D3DXQuaternionIdentity(&QrotHalfDA);
    D3DXQuaternionRotationAxis(&QrotHalfDA, &QuatT-
        mpAxis2, QuatTmpAngle2*.5);
    D3DXQuaternionInverse(&QrotHalfDAInv,&QrotH-
alfDA);
    //Do the same as above, but at point D
    QuatTmpAxis3=m_NewPrediction.m_AngVel;
    QuatTmpAngle3=m_NewPrediction.m_AngVel.
Length( )OneHalfTI;
    FixAxisAngle(&QuatTmpAxis3, &QuatTmpAngle3);
    D3DXQuatemionIdentity(&QHalfDerivD);
    D3DXQuaternionRotationAxis(&QHalfDerivD,
        &QuatTmpAxis3, QuatTmpAngle3);
    D3DXQuaternionInverse(&QHalfDerivDInv,&QHalf-
DerivD);
    D3DXQuaternionMultiply(&QTmp,    &QHalfDerivA,
&QA);
    NormalizeQuaternion(&QTmp, &QTmp);
    D3DXQuaternionMultiply(&QB,         &QrotHalfDA,
&QTmp);
    NormalizeQuaternion(&QB, &QB);
    D3DXQuaternionMultiply(&QTmp, &QHalfDerivDInv,
&QD);
    NormalizeQuaternion(&QTmp, &QTmp);
    D3DXQuaternionMultiply(&QC,       &QrotHalfDAInv,
&QTmp); NormalizeQuaternion(&QC, &QC);
    //Cache our results
    SetQuaternionSensePositive(&QB);
    m_OrientQuat2=QB;
    SetQuaternionSensePositive(&QC);
    m_OrientQuat3=QC;
    SetQuaternionSensePositive(&m_OldOrientQuat);
    SetQuaternionSensePositive(&m_NewOrientQuat);
    //The 4 Quaternions for the interpolation interval are now
    //m_OldOrientQuat, QB, QC, m_NewOrientQuat
}
```

Figure 13:
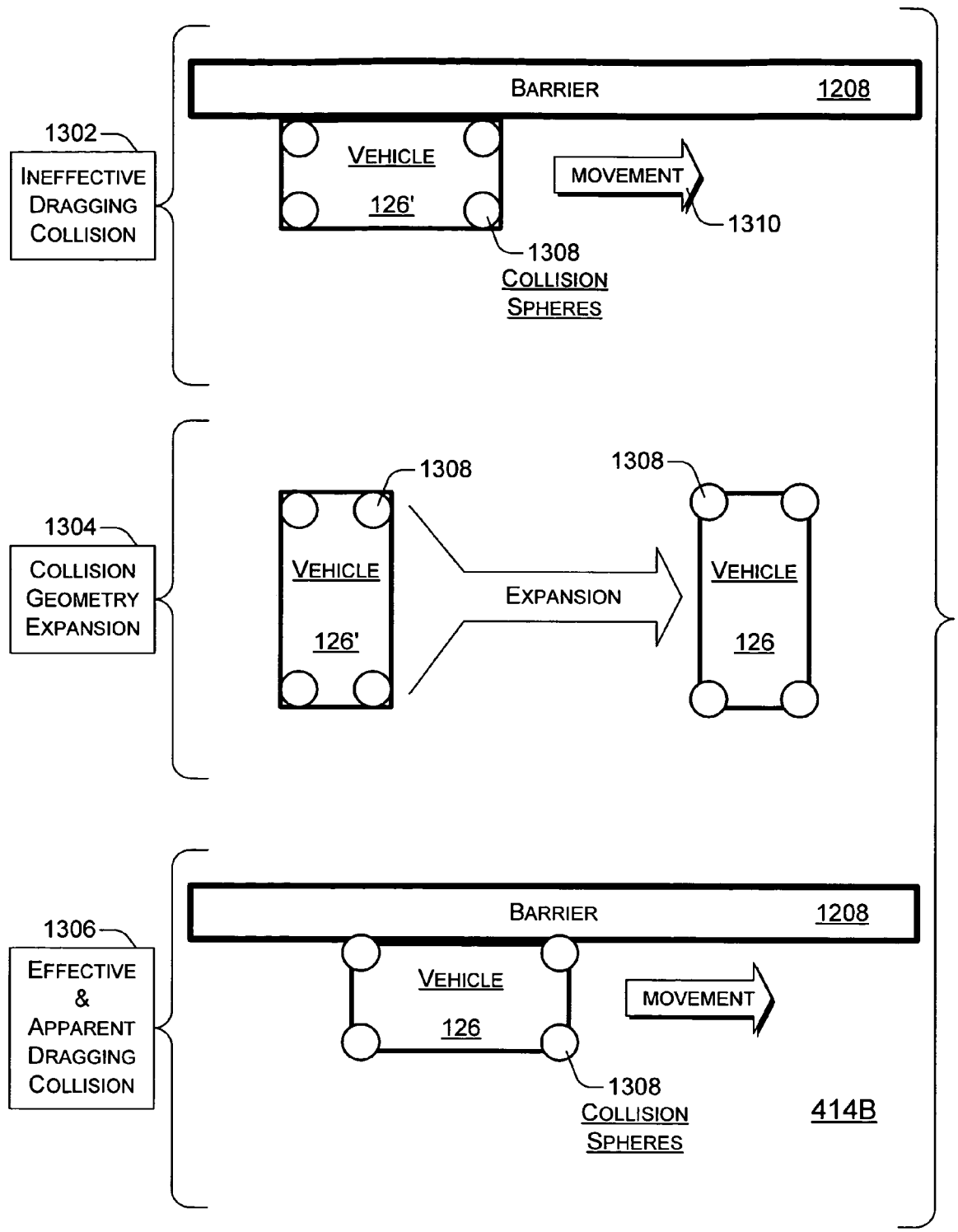
FIG. 13 is a block diagram illustrating an exemplary scheme for effectuating dragging collisions in an interpolation environment.

FIG. 13 is a block diagram illustrating an exemplary scheme for effectuating dragging collisions in an interpolation environment. Specifically, dragging collisions effectuator 414B is shown with regard to an effective and apparent dragging collision 1306, as is described below.

An ineffective dragging collision 1302 is shown at the top third of FIG. 13. As illustrated, a vehicle 126' includes four collision spheres 1308. However, a vehicle may include a different number of collision spheres 1308. Collision spheres 1308 serve to define and/or mathematically model where and when a collision is occurring. As indicated by the "movement" arrow 1310, vehicle 126' is engaged in a dragging collision with barrier 1208.

For an exemplary collision, assume a vehicle 126' is scraping along the edge of barrier 1208, which is concrete. Vehicle 126' is colliding with barrier 1208 practically, if not actually, continuously. To represent the collision realistically, sparks fly off the wall, and the vehicle leaves paint on the barrier. Unfortunately, these collision affects are not produced automatically. The predicted vehicle state may indicate the final position of vehicle 126' after the collision with barrier 1208. At this point, vehicle 126' is not in contact with barrier 1208. As is apparent from ineffective dragging collision 1302, vehicle 126' and collision spheres 1308 move along barrier 1208, but they may not actually touch. As a result, no collision effect is rendered on the remote device to reflect the vehicle's dragging along barrier 1208.

A collision geometry expansion 1304 is shown in the middle third of FIG. 13. With vehicle 126', collision spheres 1308 are located at approximately the outer edge or boundary of vehicle 126'. With the expansion of collision geometry expansion 1304, collision spheres 1308 are moved outward over the edge or boundary of vehicle 126' to produce vehicle 126. More specifically, the collision geometry is expanded for vehicles 126 that are subject to interpolation at remote devices.

Vehicle 126 of collision geometry expansion 1304 illustrates an exaggerated movement of collision spheres 1308 over the boundaries thereof. In other words, FIG. 13 is not necessarily to scale. Although alternative expansion distances may be employed, an exemplary expansion distance for moving collision spheres 1308 outward over the edges of vehicle 126 is 3 millimeters (mm). Three mm is usually sufficient for the collision to engender scraping effects such as sounds and sparks. The collision effects may be produced by a collision system that is separate from or fully or partially part of interpolator 306.

An effective and apparent dragging collision 1306 is shown at the bottom third of FIG. 13. As a result of dragging collisions effectuator 414B, at least one collision sphere 1308 is located beyond one or more boundaries of vehicle 126. As is apparent from the effective and apparent dragging collision 1306, collision spheres 1308 of vehicle 126 contact barrier 1208 and trigger collision effects, even under interpolation, as vehicle 126 engages in a dragging movement along barrier 1208.

Figure 14:
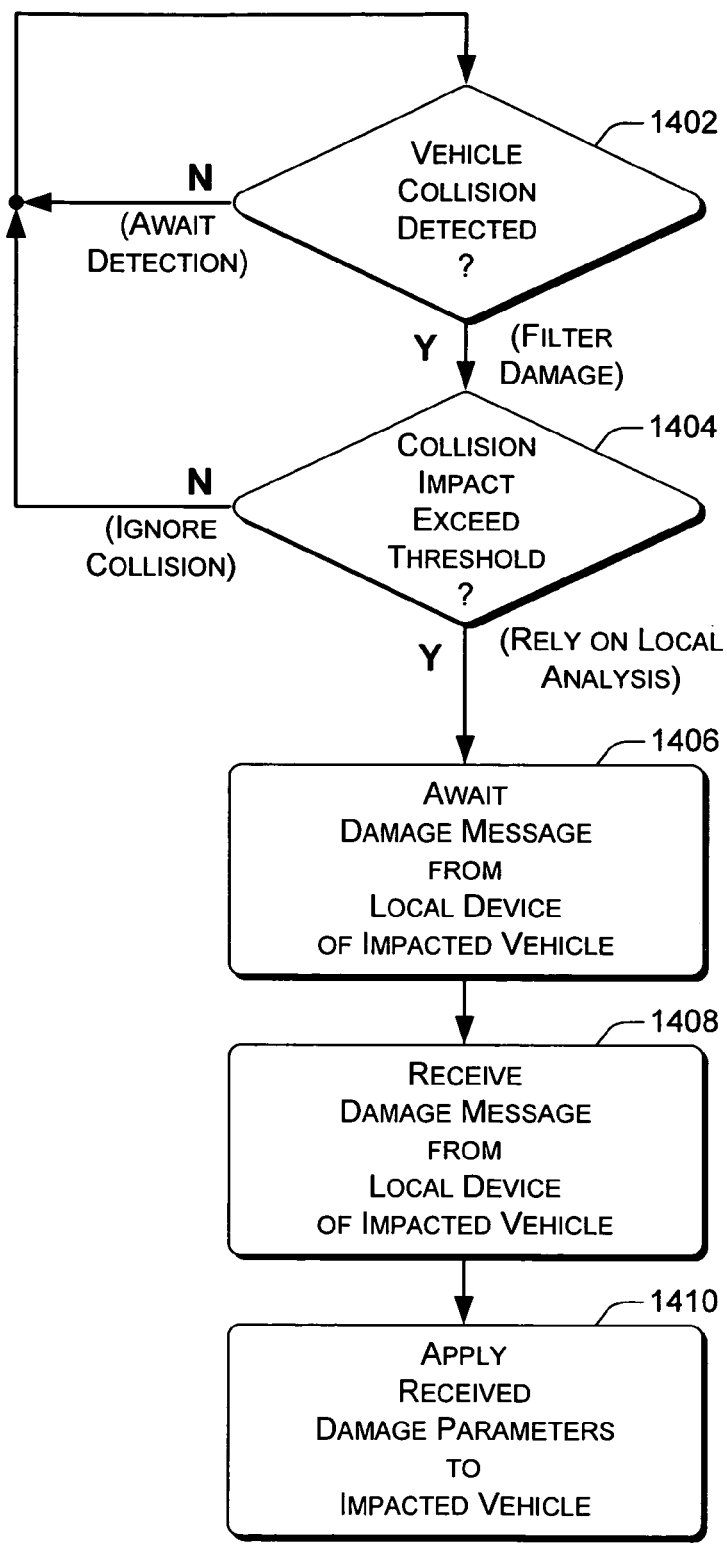
FIG. 14 is a flow diagram illustrating an exemplary technique for implementing a remote vehicle damage agent in an interpolation environment.

FIG. 14 is a flow diagram 414C illustrating an exemplary technique for implementing a remote vehicle damage agent in an interpolation environment. Flow diagram 414C includes five (5) blocks 1402-1410. Although the actions of blocks 1402-1410 may be performed in other implementations and environments, FIGS. 1-4 and 11 are used in particular to illuminate certain aspects of the technique. For example, the actions of blocks 1402-1410 may be performed by a remote game console 102(2) with respect to a local game console 102(1) from which damage parameters are ultimately received.

Generally, when a vehicle crashes into a barrier or other object, it is likely to become damaged. Any impact that results in damage to a vehicle affects its vehicle model. If the vehicle model's damage level is not kept consistent across the devices participating in a shared game, a vehicle's appearance can change as it passes from one screen to another due to damage inconsistencies (which may arise if each device calculates damage independently).

An approach to avoid this inconsistency is to apply at remote devices the same damage as applied by the device at which the vehicle is local. To more easily achieve this consistency, the damage potential is filtered so that only a certain size or intensity of impact actually causes damage. When such an appreciable impact occurs, the same damage parameters are passed to all remote devices, which then apply these same damage parameters to the vehicle(s). As a result, when interpolator 306 is interpolating vehicles, even if they collide with something, the vehicles are not damaged (or at least are not visually represented as being damaged) until a damage message having damage parameters arrives from the device that is locally simulating the vehicle involved in the collision.

The flow chart of FIG. 14 represents an implementation of remote vehicle damage agent 414C that is performed at remote devices with regard to vehicles being interpolated thereat and actually simulated on other devices that are local with respect to those vehicles.

At block 1402, it is determined if a vehicle collision has been detected. If not, the technique continues at block 1402 to await a vehicle collision detection.

If, on the other hand, a vehicle collision is detected (at block 1402), then the possibility of damage is filtered by determining if the impact of the collision exceeds a predetermined impact threshold at block 1404. In other words, a relatively high threshold for damage is instituted. For example, if the component of velocity in the direction of a collision exceeds 30 miles per hour (mph), then damage is applied to the vehicle; otherwise, the collision is ignored with regard to damage. If the impact of the collision does not exceed the predetermined impact threshold, then the collision is ignored for damage purposes and the technique returns to block 1402.

If, on the other hand, it is determined (at block 1404) that the collision impact does exceed the predetermined impact threshold, then the remote device is to rely on a damage analysis provided by the local device of the involved vehicle. Thus, at block 1406, the remote device awaits a damage message from the local device of the impacted vehicle.

At block 1408, a damage message, which includes damage parameters for the impacted vehicle, is received from the local device of the impacted vehicle.

At block 1410, the received damage parameters are applied to the impacted vehicle. For example, the remote device may apply the damage parameters to the vehicle model of the impacted vehicle when displaying the impacted vehicle.

The devices, actions, aspects, features, procedures, components, etc. of FIGS. 1-14 are illustrated in diagrams that are divided into multiple blocks. However, the order, interconnections, interrelationships, layout, etc. in which FIGS. 1-14 are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for coordinating multiple vehicles across a network. Furthermore, although the description herein includes references to specific implementations (and the exemplary console-based gaming system 100 of FIGS. 1 and 2 above), the illustrated and/or described implementations can be implemented in any suitable hardware, software, firmware, or combination thereof and using any suitable network-capable device(s), network architecture(s), set of physics parameters, communication protocol(s), and so forth.

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. A device comprising:
   at least one processor; and
   one or more media including processor-executable instructions that are executed by the at least one processor, the processor-executable instructions adapted to direct the device to perform actions comprising:
      producing an interpolated vehicle state from a predicted vehicle state via an interpolation, the predicted vehicle state received from another device via a network;
      determining a latency of the network between the device and the another device;
      adjusting a global time based on the latency;
      maintaining time synchronization between the device and the another device; and
      tuning the interpolation of the predicted vehicle state with regard to collisions by expanding collision geometry of a vehicle model associated with the predicted vehicle state, the expanded collision geometry comprises two or more collision spheres located at least partially over a boundary edge of the vehicle model, wherein the two or more collision spheres define and mathematically model where and when a collision occurs to the vehicle model for tuning the interpolated vehicle state.

2. The device as recited in claim 1, wherein the actions of producing and tuning are performed at least partially simultaneously.

3. The device as recited in claim 1, wherein the processor-executable instructions are adapted to cause the device to receive the predicted vehicle state from the another device via at least one network, the another device simulating a vehicle associated with the predicted vehicle state on a local basis.

4. The device as recited in claim 1, wherein the device comprises a console platform.

5. The device as recited in claim 1, the processor-executable instructions adapted to direct the device to perform actions further comprising handling glancing collisions by employing a higher-order interpolation comprising:
   employing a Hermite curve to interpolate a continuous curve for position and velocity; and
   employing a squad function to interpolate a rotational orientation of the interpolated vehicle state.

6. The device as recited in claim 1, wherein the two or more collision spheres define and mathematically model where and when a dragging collision occurs between a vehicle and a barrier, wherein the barrier includes any object including at least the vehicle and a concrete barrier.

7. The device as recited in claim 1, wherein the action of tuning the interpolation with regard to collisions comprises the action of:
   filtering application of damage after collisions using a predetermined impact threshold.

8. The device as recited in claim 1, wherein the action of tuning the interpolation with regard to collisions comprises the action of:
   delaying application of damage from a collision until after damage parameters are received from the another device that is locally simulating a vehicle associated with the predicted vehicle state.

9. The device as recited in claim 1, wherein the predicted vehicle state is received via a peer to peer connection from the another device.

10. One or more processor-accessible storage media comprising processor-executable instructions that, when executed, direct a device to produce an arrangement for tuning interpolation, the arrangement comprising:
    interpolation means for interpolating a vehicle state corresponding to an interpolation time from a predicted vehicle state corresponding to a prediction time; and
    tuning means for tuning the interpolation means with regard to collisions, wherein the tuning means includes:
       a handler means for handling glancing collisions;
       an effectuation means for effectuating dragging collisions; and
       an agent means for instituting same damage parameters at a remote device as are applied to a vehicle at a local device, the local device associated with the predicted vehicle state.

11. The arrangement as recited in claim 10, further comprising:
    receiver means for receiving the predicted vehicle state via at least one network from the device that is locally simulating the vehicle associated with the predicted vehicle state.

12. The arrangement as recited in claim 10, wherein the vehicle associated with the predicted vehicle state is selected from a group comprising: a car, a truck, a boat, a space ship, a plane, a bicycle, a motorcycle, and a hovercraft.

13. The arrangement as recited in claim 10, further comprising producing means and tuning means for performing producing and tuning at least partially simultaneously.

14. The arrangement as recited in claim 10, wherein the handler means of the tuning means further comprises a higher-order interpolation means for interpolating the vehicle between (i) a first position and a current time and (ii) a second position and the prediction time, wherein the second position comprises part of the predicted vehicle state, and the vehicle is associated with the predicted vehicle state.

15. The arrangement as recited in claim 10, wherein the effectuation means comprises expansion means for expanding collision geometry of a vehicle model associated with the predicted vehicle state.

16. The arrangement as recited in claim 10, wherein the agent means further comprises:
    means for filtering application of damage from collisions based on impact intensity, the means for filtering recognizes and applies damage from a collision where a component of velocity in a direction of the collision exceeds a predetermined threshold, otherwise damage from collisions is not applied to the vehicle;
    means for sending a damage message including damage parameters from the local device associated with the predicted vehicle state to each device remote from the vehicle associated with the damage message; and
    means for applying damage parameters when the collision is of a sufficiently high impact intensity.

17. One or more processor-accessible storage media comprising processor-executable instructions that, when executed, direct a device to perform a method, the method comprising:
    producing an interpolated vehicle state from a predicted vehicle state using higher-order interpolation, the predicted vehicle state received via a network, producing the interpolated vehicle state includes using expanded collision geometry, the expanded collision geometry includes two or more collision spheres located at least partially over a boundary edge of a vehicle model used to produce the interpolated vehicle state, the two or more collision spheres trigger collision effects and are used to define and mathematically model damage from collisions; and maintaining synchronization of a time base using interpolation values received from another device via the network.

18. The one or more processor-accessible media as recited in claim 17, comprising the processor-executable instructions wherein the higher-order interpolation involves using a Hermite curve for position and velocity and a squad function for orientation.

19. The one or more processor-accessible media as recited in claim 17, comprising the processor-executable instructions wherein the higher-order interpolation comprises a non-linear interpolation.

20. The one or more processor-accessible media as recited in claim 17, comprising the processor-executable instructions wherein the higher-order interpolation includes interpolating vehicle motion in accordance with a continuous curve for position and velocity.

21. The one or more processor-accessible media as recited in claim 17, comprising the processor-executable instructions wherein the higher-order interpolation is performed in a glancing collision context.

22. The one or more processor-accessible media as recited in claim 17, comprising the processor-executable instructions that, when executed, further direct the device to realize damage from collisions based on collision damage parameters received via the network.

23. One or more processor-accessible storage media comprising processor-executable instructions that, when executed, direct a device to produce an interpolated vehicle state from a predicted vehicle state in which interpolation includes a vehicle having expanded collision geometry associated with the predicted vehicle state, the expanded collision geometry includes two or more collision spheres used to trigger collision effects, the predicted vehicle state received via a network and wherein the interpolated vehicle state being synchronized based on a latency of the network and a global time.

24. The one or more processor-accessible media as recited in claim 23, comprising the processor-executable instructions wherein at least one collision sphere of the vehicle is located at least partially beyond a boundary edge of the vehicle.

25. The one or more processor-accessible media as recited in claim 24, comprising the processor-executable instructions wherein the at least one collision sphere of the vehicle is expandable to include an expansion distance beyond the boundary edge of the vehicle, the expansion distance being configurable to produce collision effects.

26. The one or more processor-accessible media as recited in claim 23, comprising the processor-executable instructions wherein the vehicle is associated with the predicted vehicle state and is approximately rectangular with four corners, and wherein four collision spheres of the vehicle are located proximate to the four corners and at least partially beyond at least one boundary edge of the vehicle.

27. The one or more processor-accessible media as recited in claim 23, comprising the processor-executable instructions that, when executed, further direct the device to receive the predicted vehicle state via the network from another device, wherein the device and the another device are participating in a joint game using the network.

28. The one or more processor-accessible media as recited in claim 23, comprising the processor-executable instructions that, when executed, further direct the device (i) to produce the interpolated vehicle state using higher-order interpolation and (ii) to realize damage from collisions based on collision damage parameters received via the network.

29. One or more processor-accessible storage media comprising processor-executable instructions that, when executed, direct a device to perform actions comprising:
  detecting, at a local device, a collision involving a vehicle that is being locally simulated on a remote device, the local device and the remote device in communication via a network, the local device remotely simulating the vehicle;
  filtering the collision according to size and intensity of impact to determine damage parameters of the collision, wherein filtering includes recognizing damage from the collision where a component of velocity in a direction of the collision exceeds a predetermined impact threshold, otherwise damage from the collision is not recognized and no damage effects are applied to the vehicle; and
  responsive to the recognizing damage from the collision, delaying application of damage effects to the vehicle, simulated at the local device, until a damage message having damage parameters is received from the remote device.

30. The one or more processor-accessible media as recited in claim 29, comprising the processor-executable instructions that, when executed, direct the device to perform a further action comprising receiving the damage message from the another device via at least one network.

31. The one or more processor-accessible media as recited in claim 29, comprising the processor-executable instructions that, when executed, direct the device to perform a further action comprising applying the damage parameters from the damage message received from the another device to a vehicle model of the vehicle.

32. The one or more processor-accessible media as recited in claim 29, wherein the one or more processor-accessible media comprise at least one of (i) one or more storage media and (ii) one or more transmission media.

33. The one or more processor-accessible media as recited in claim 29, comprising the processor-executable instructions that, when executed, direct the device to perform further actions comprising:
  interpolating an interpolated vehicle state from a predicted vehicle state using a higher-order interpolation between a current vehicle state and the predicted vehicle state; and
  interpolating the interpolated vehicle state from the predicted vehicle state using collision spheres that are located at least partially beyond a boundary edge of the vehicle.

* * * * *

UNITED STATES PATENT AND TRADEMARK OFFICE
CERTIFICATE OF CORRECTION

| | | |
|---|---|---|
| PATENT NO. | : 7,803,054 B1 | Page 1 of 1 |
| APPLICATION NO. | : 10/817709 | |
| DATED | : September 28, 2010 | |
| INVENTOR(S) | : Aaron W. Ogus et al. | |

It is certified that error appears in the above-identified patent and that said Letters Patent is hereby corrected as shown below:

On the Title Page,

Column 1, Item 75, change "David E. Glerok" to -- David E. Gierok --.

Signed and Sealed this
Eighteenth Day of January, 2011

David J. Kappos
*Director of the United States Patent and Trademark Office*